(12) United States Patent
Marcoux

(10) Patent No.: US 10,330,902 B1
(45) Date of Patent: Jun. 25, 2019

(54) ILLUMINATION OPTICS AND DEVICES

(71) Applicant: DBM REFLEX ENTERPRISES INC., Laval (CA)

(72) Inventor: Eric Marcoux, Laval (CA)

(73) Assignee: DBM REFLEX ENTERPRISES INC., Laval, Quebec (CA)

( * ) Notice: Subject to any disclaimer, the term of this patent is extended or adjusted under 35 U.S.C. 154(b) by 0 days.

(21) Appl. No.: 16/007,502

(22) Filed: Jun. 13, 2018

Related U.S. Application Data

(60) Provisional application No. 62/521,139, filed on Jun. 16, 2017.

(51) Int. Cl.
| | |
|---|---|
| *G02B 27/30* | (2006.01) |
| *G02B 17/00* | (2006.01) |
| *F21V 5/04* | (2006.01) |
| *F21V 5/00* | (2018.01) |
| *G02B 1/04* | (2006.01) |
| *G02B 5/02* | (2006.01) |
| *G02B 3/08* | (2006.01) |

(52) U.S. Cl.
CPC ............ *G02B 17/006* (2013.01); *F21V 5/002* (2013.01); *F21V 5/045* (2013.01); *G02B 1/041* (2013.01); *G02B 3/08* (2013.01); *G02B 5/0221* (2013.01); *G02B 27/30* (2013.01)

(58) Field of Classification Search
CPC ...... G02B 17/006; G02B 3/08; G02B 5/0221; G02B 1/041; G02B 27/30; F21V 5/045; F21V 5/002
See application file for complete search history.

(56) References Cited

U.S. PATENT DOCUMENTS

| | | | |
|---|---|---|---|
| 5,068,768 A | 11/1991 | Kobayashi | |
| 5,323,302 A | 6/1994 | Bertling et al. | |

(Continued)

FOREIGN PATENT DOCUMENTS

| | | |
|---|---|---|
| CN | 203431719 U | 2/2014 |
| CN | 103423703 B | 9/2015 |

(Continued)

OTHER PUBLICATIONS

Machine translation in English of CN103423703.
(Continued)

*Primary Examiner* — Donald L Raleigh
(74) *Attorney, Agent, or Firm* — IPAXIO S.E.N.C.

(57) ABSTRACT

The illumination optic is a collimator lens having a solid monolithic structure that includes spaced-apart and longitudinally-extending side lobed segments laterally disposed around a central core section. Each lobed segment has a TIR inner peripheral surface extending from a rear side towards a front side of the collimator lens and has a light exit surface generally facing the front side. Also disclosed is an illumination device including the collimator lens and a diffusion lens that is coaxially positioned next to its front side to redirect light coming out of the light exit surfaces. The diffusion lens has spaced-apart outlying optical regions disposed around a central optical axis, at least one for each light exit surface, to be selectively positioned in or out of alignment with a corresponding one of the light exit surfaces depending on a relative angular position between the collimator lens and the diffusion lens.

20 Claims, 21 Drawing Sheets

(56) References Cited

U.S. PATENT DOCUMENTS

| | | | |
|---|---|---|---|
| 5,359,691 A | 10/1994 | Tai et al. | |
| 5,526,190 A * | 6/1996 | Hubble, III | F21V 7/0091 347/102 |
| 5,668,913 A | 9/1997 | Tai et al. | |
| 5,671,994 A | 9/1997 | Tai et al. | |
| 5,791,757 A | 8/1998 | O'Neil et al. | |
| 6,102,559 A | 8/2000 | Nold et al. | |
| 6,130,730 A | 10/2000 | Jannson et al. | |
| 6,174,064 B1 | 1/2001 | Kalantar et al. | |
| 6,256,447 B1 | 7/2001 | Laine | |
| 6,761,475 B2 | 7/2004 | Perlo et al. | |
| 7,083,297 B2 * | 8/2006 | Matthews | F21L 4/027 362/183 |
| 7,088,905 B1 | 8/2006 | Nemoto et al. | |
| 7,160,010 B1 * | 1/2007 | Chinniah | F21S 43/243 362/511 |
| 7,218,830 B2 | 5/2007 | Iimura | |
| 7,354,185 B2 | 4/2008 | Yu et al. | |
| 7,410,274 B2 | 8/2008 | Nagabuchi | |
| 7,433,134 B2 * | 10/2008 | Chou | G02B 19/0071 359/712 |
| 7,438,454 B2 * | 10/2008 | Chinniah | B60Q 1/2696 362/500 |
| 7,470,054 B2 | 12/2008 | Lee | |
| 7,494,257 B2 | 2/2009 | Gebauer et al. | |
| 7,524,091 B2 * | 4/2009 | King | F21V 7/0091 362/311.01 |
| 7,537,374 B2 | 5/2009 | Schardt et al. | |
| 7,551,243 B2 | 6/2009 | Cernasov | |
| 7,554,742 B2 | 6/2009 | Chinniah et al. | |
| 7,580,192 B1 * | 8/2009 | Chu | F21V 5/04 359/641 |
| 7,679,828 B2 | 3/2010 | Munro | |
| 7,695,179 B2 | 4/2010 | Eichelberger | |
| 7,695,180 B2 | 4/2010 | Schardt et al. | |
| 7,726,854 B2 | 6/2010 | Bourdin et al. | |
| 7,855,815 B2 | 12/2010 | Hayashide et al. | |
| 7,969,531 B1 | 6/2011 | Li et al. | |
| 8,016,451 B2 | 9/2011 | Householder et al. | |
| 8,023,065 B2 | 9/2011 | Epstein et al. | |
| 8,152,352 B2 | 4/2012 | Richardson | |
| 8,206,017 B2 | 6/2012 | Zwick | |
| 8,246,210 B2 | 8/2012 | Angelini et al. | |
| 8,246,216 B2 | 8/2012 | Jiang et al. | |
| 8,322,874 B2 | 12/2012 | Ender | |
| 8,360,623 B2 | 1/2013 | Lin et al. | |
| 8,430,552 B2 | 4/2013 | Lin et al. | |
| 8,454,214 B2 | 6/2013 | Kazaoka | |
| 8,469,573 B2 | 6/2013 | Shih et al. | |
| 8,469,575 B2 | 6/2013 | Weber et al. | |
| 8,545,037 B2 | 10/2013 | Ender | |
| 8,641,230 B1 | 2/2014 | Jiang | |
| 8,646,960 B2 | 2/2014 | Aho et al. | |
| 8,721,152 B2 | 5/2014 | Coleman et al. | |
| 8,724,080 B2 | 5/2014 | Patra | |
| 8,733,981 B2 | 5/2014 | Jiang et al. | |
| 8,783,898 B2 | 7/2014 | Coleman et al. | |
| 8,794,812 B2 | 8/2014 | Coleman et al. | |
| 8,814,391 B2 | 8/2014 | Koh et al. | |
| 8,845,142 B2 | 9/2014 | De Lamberterie | |
| 8,876,355 B2 | 11/2014 | Nomoto et al. | |
| 8,891,171 B2 | 11/2014 | Choquet et al. | |
| 8,979,316 B2 | 3/2015 | Lee et al. | |
| 9,164,268 B2 | 10/2015 | Bigliatti et al. | |
| 9,360,185 B2 | 6/2016 | Demuynck et al. | |
| 9,435,934 B2 | 9/2016 | Morgan et al. | |
| 9,464,768 B2 | 10/2016 | Stein | |
| 2002/0080615 A1 * | 6/2002 | Marshall | F21V 5/04 362/333 |
| 2003/0235050 A1 * | 12/2003 | West | F21V 5/04 362/327 |
| 2004/0070855 A1 * | 4/2004 | Benitez | G02B 3/02 359/858 |
| 2005/0265041 A1 | 12/2005 | Wimbert | |
| 2006/0067084 A1 | 3/2006 | Stefanov | |
| 2006/0291201 A1 * | 12/2006 | Smith | F21V 5/04 362/227 |
| 2008/0106910 A1 * | 5/2008 | Bollea | F21V 5/04 362/545 |
| 2009/0121238 A1 * | 5/2009 | Peck | F21V 13/04 257/89 |
| 2009/0128921 A1 * | 5/2009 | Roth | F21V 5/04 359/641 |
| 2009/0146049 A1 * | 6/2009 | Hsieh | F21V 7/0091 250/216 |
| 2009/0218525 A1 | 9/2009 | Ikeda et al. | |
| 2009/0268469 A1 * | 10/2009 | Huang | H04N 9/315 362/308 |
| 2010/0226127 A1 * | 9/2010 | Bigliatti | F21V 5/00 362/235 |
| 2010/0278480 A1 | 11/2010 | Vasylyev | |
| 2010/0327302 A1 * | 12/2010 | Wang | F21V 5/008 257/98 |
| 2011/0128469 A1 | 6/2011 | Wang | |
| 2012/0039076 A1 * | 2/2012 | Chuang | F21V 5/002 362/297 |
| 2012/0039084 A1 | 2/2012 | Eckhardt et al. | |
| 2012/0121244 A1 | 5/2012 | Stavely | |
| 2012/0268940 A1 | 10/2012 | Sahlin et al. | |
| 2012/0300469 A1 * | 11/2012 | Jorgensen | F21V 5/008 362/327 |
| 2013/0003398 A1 | 1/2013 | Godbillon | |
| 2013/0027927 A1 | 1/2013 | Wegger et al. | |
| 2013/0128620 A1 | 5/2013 | Kosuge et al. | |
| 2013/0134456 A1 * | 5/2013 | Lu | F21V 5/002 257/89 |
| 2013/0247960 A1 | 9/2013 | Morgan | |
| 2013/0258709 A1 | 10/2013 | Thompson et al. | |
| 2014/0003033 A1 * | 1/2014 | Li | F21V 13/04 362/97.4 |
| 2014/0036510 A1 * | 2/2014 | Preston | F21V 7/0091 362/296.01 |
| 2014/0043846 A1 | 2/2014 | Yang et al. | |
| 2015/0109789 A1 * | 4/2015 | Tukker | G02B 19/0028 362/293 |
| 2015/0167935 A1 | 6/2015 | Beghelli | |
| 2015/0183525 A1 * | 7/2015 | De Jager | B64D 45/08 340/983 |
| 2015/0211708 A1 | 7/2015 | Stavely et al. | |
| 2015/0219313 A1 * | 8/2015 | Marcaly | F21V 5/006 362/309 |
| 2016/0010829 A1 * | 1/2016 | Gielen | F21V 5/045 362/235 |
| 2016/0195243 A1 * | 7/2016 | Dross | F21V 7/0091 362/297 |
| 2016/0223164 A1 * | 8/2016 | Wang-Munson | F21V 13/04 |
| 2016/0299327 A1 * | 10/2016 | Grabher | G02B 21/086 |
| 2016/0312979 A1 * | 10/2016 | Ebner | G02B 19/0066 |
| 2017/0268749 A1 * | 9/2017 | Pet | G02B 19/0014 |
| 2017/0321865 A1 * | 11/2017 | Parker | F21V 7/0016 |
| 2018/0135831 A1 * | 5/2018 | Smith | G02B 3/00 |
| 2018/0292071 A1 * | 10/2018 | Tarsa | F21V 13/04 |

FOREIGN PATENT DOCUMENTS

| | | |
|---|---|---|
| CN | 205640389 U | 10/2016 |
| CN | 205640751 U | 10/2016 |
| DE | 10134278 A1 | 1/2003 |
| EP | 1103757 A2 | 5/2001 |
| EP | 1055867 B1 | 4/2004 |
| EP | 1491815 B1 | 3/2010 |
| EP | 2650707 A1 | 10/2013 |
| FR | 2731502 A1 | 9/1996 |
| JP | 5803051 B2 | 11/2015 |

OTHER PUBLICATIONS

Machine translation in English of CN203431719.
Machine translation in English of CN205640389.
Machine translation in English of CN205640751.

(56) References Cited

OTHER PUBLICATIONS

Machine translation in English of DE10134278.
Machine translation in English of EP1055867.
Machine translation in English of EP1103757.
Machine translation in English of EP1491815.
Machine translation in English of EP2650707.
Machine translation in English of FR2731502.
Machine translation in English of JP5803051.

* cited by examiner

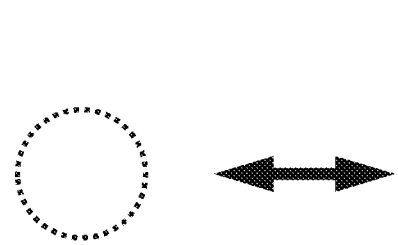
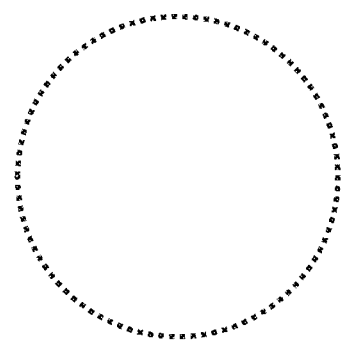
FIG. 28          FIG. 29
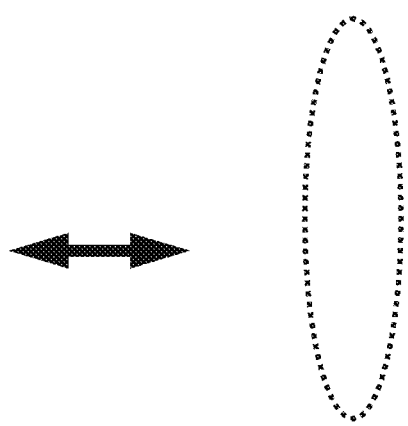
FIG. 30          FIG. 31
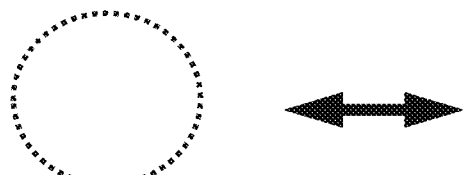
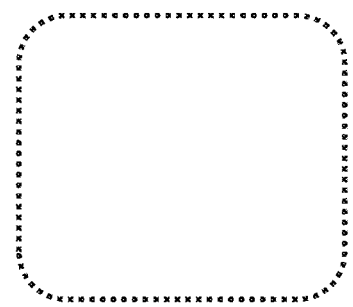
FIG. 32          FIG. 33

US 10,330,902 B1

ILLUMINATION OPTICS AND DEVICES

CROSS REFERENCE TO PRIOR APPLICATION

The present case claims the benefits of U.S. patent application No. 62/521,139 filed 16 Jun. 2017, the entire content of which is hereby incorporated by reference.

TECHNICAL FIELD

The technical field relates generally to illumination optics and devices for use with light sources.

BACKGROUND

Illumination arrangements including a light source and a corresponding lens have been used in many applications to generate light projections. In general, it is desirable that the size of an illumination device, more particularly the overall length with reference to the central optical axis along which light propagate, be kept as small as possible for the intended use. This can be required in view of different constraints, such as space restrictions, weight limitations and manufacturing cost targets, to name just a few, depending on the application and the implementation. One approach to improve compactness includes using a reflector inside the illumination device, thereby allowing the light source to be positioned closer to the light output. While the term "reflector" often refers to an optical component having mirror-like coated surfaces to reflect incident light (i.e. having specular reflection), it also designates an optical component, for instance a lens, in which total internal reflection (TIR) can occur without the need of any mirror-like coated surfaces. Light can reflect back on a TIR surface inside a lens with almost a 100% efficiency when the angle of incidence of the light rays is above a critical angle and when some other conditions are met.

Some lenses can be used in illumination devices and arrangements to simultaneously collimate light coming from a light source at the lens entry and reflect this light towards the lens exit. Using TIR inside these illumination optics is generally preferred whenever possible because specular reflection is not as efficient as TIR. Most applications will thus have illumination optics relying on TIR without having any significant specular reflection therein or with only specular reflection being used therein in limited areas. Nevertheless, some implementations can use illumination optics relying only on specular reflection.

For the sake of simplicity, lenses used as collimator/reflectors in illumination devices and applications will now be referred to as collimator lenses from this point onwards.

Light coming from a light source with which an illumination device is optically coupled enters the collimator lens of the device but some of this light can be lost if the acceptance angle of the light is not optimum everywhere at the light entry surfaces. Improving the capture of this light is highly desirable since it can increase the overall light output efficiency and/or uniformity. In order words, energy savings can be made with a more efficient light collection at the entry of the collimator lens since more light can be outputted for the same input and the energy provided to generate light at the light source can then be reduced. Furthermore, there are implementations where the goal is to have a maximum amount of light so optimizing the efficiency of the collimator lens is also very desirable in such situation.

Various other challenges and limitations also exist in the related technical field. Among other things, some applications may require illumination optics capable of accommodating sensors, cameras or other features in the immediate vicinity of the front side of a collimator lens. This may be very difficult to achieve using a collimator lens having a circular perimeter.

Mass-producing collimator lenses with a very high surface accuracy and a stable batch-to-batch consistency while minimizing costs can often be difficult using known methods and designs, particularly when they involve injection molding of a plastic resin material because the injection molding process itself may cause deformations of the optical active surfaces. Plastic lenses tend to shrink during cooling and this phenomenon can create issues when certain portions of the lenses cool at a different rate compared to others. The presence of thicker portions in lenses often tend to be detrimental to the surface accuracy and performances. In general, it is thus desirable to design lenses where all portions can be cooled relatively at the same rate when it solidifies at the end of the injection molding manufacturing process. Furthermore, minimizing the amount of plastic resin material required for making each lens is also desirable to reduce manufacturing costs and the weight of the final products.

Still, there are several applications where the projected light to be changed somehow, for instance in size, shape, orientation, or a combination thereof, while the illumination devices are in use. Examples includes, among other things, headlights of vehicles, flashlights, stage lighting for concerts or other events, light art shows and exhibits, to name just a few. Many others exist as well. These devices include, for instance, illumination optics movable along the central optical axis or having a light source that is movable along the central optical axis. Moving parts along the central optical axis changes the focal distance between the light source and the optics inside the illumination device, thereby creating a zooming effect that can change the size of the light projection from narrow or wide, or vice-versa. This approach may be suitable in many applications but may be unsatisfactory or inadequate in others, particularly when the available space is very limited, such as in automotive applications. It may also create additional complexities. Furthermore, the light collection efficiency and the shape can be very difficult to control over the entire range of positions.

Overall, room for many improvements always exists in this area of technology.

SUMMARY

In one aspect, there is provided a collimator lens for conveying light rays coming from a light source and that are generally propagating along a central optical axis so as to form a light projection, the collimator lens having a solid monolithic structure and made of a transparent material having a first refractive index, the collimator lens having a rear side and a front side, the collimator lens including: a central core section; a plurality of spaced-apart and longitudinally-extending side lobed segments laterally disposed around the central core section, each lobed segment having a TIR inner peripheral surface extending from the rear side towards the front side of the collimator lens, and having a light exit surface generally facing the front side, the TIR inner peripheral surfaces being separated from one another by a medium having a second refractive index that is lower than the first refractive index; and a light entry cavity located inside the central core section, the light entry cavity being opened at the rear side of the collimator lens and having a plurality of longitudinally-extending and distinct convex side wall surfaces, one for each of the lobed segments, each side wall surface being configured and disposed to collimate a portion of the light rays onto a corresponding one of the TIR inner peripheral surfaces, from which the light rays are reflected inside the collimator lens towards a corresponding one of the light exit surfaces, each side wall surface having an edge extending along the rear side of the collimator lens.

In another aspect, there is provided an illumination device for conveying light rays coming from a light source and generally propagating along a central optical axis so as to form a variable light projection, the illumination device including: a collimator lens having a solid monolithic structure and made of a transparent material having a first refractive index, the collimator lens having a rear side and a front side, the collimator lens including: a central core section; a plurality of spaced-apart and longitudinally-extending side lobed segments laterally disposed around the central core section, each lobed segment having a TIR inner peripheral surface extending from the rear side towards the front side of the collimator lens, and having a light exit surface generally facing the front side, the TIR inner peripheral surfaces being separated from one another by a medium having a second refractive index that is lower than the first refractive index; and a light entry cavity located inside the central core section, the light entry cavity being opened at the rear side of the collimator lens and having at least one side wall surface configured and disposed to collimate a portion of the light rays onto a corresponding one of the TIR inner peripheral surfaces, from which the light rays are reflected inside the collimator lens towards a corresponding one of the light exit surfaces; a diffusion lens coaxially disposed with reference to the central optical axis, the diffusion lens being positioned next to the front side of the collimator lens to redirect light coming out of the light exit surfaces, the diffusion lens having a plurality of spaced-apart outlying optical regions disposed around the central optical axis, at least one for each light exit surface, to be selectively positioned in or out of alignment with a corresponding one of the light exit surfaces of the collimator lens depending on a relative angular position between the collimator lens and the diffusion lens; and means for changing the relative angular position between the collimator lens and the diffusion lens around the central optical axis.

The various aspects and advantages of the proposed concept will be apparent from the following detailed description and the appended figures.

BRIEF DESCRIPTION OF THE FIGURES

FIGS. 28 and 29 are schematic views depicting the general outline of a light projection having a variable size depending on the relative angular position between the collimator lens and the diffusion lens.

FIGS. 30 and 31 are schematic views depicting the general outline of a light projection having a variable orientation depending on the relative angular position between the collimator lens and the diffusion lens.

FIGS. 32 and 33 are schematic views depicting the general outline of a light projection having a variable shape and size depending on the relative angular position between the collimator lens and the diffusion lens.

DETAILED DESCRIPTION

Figure 1:
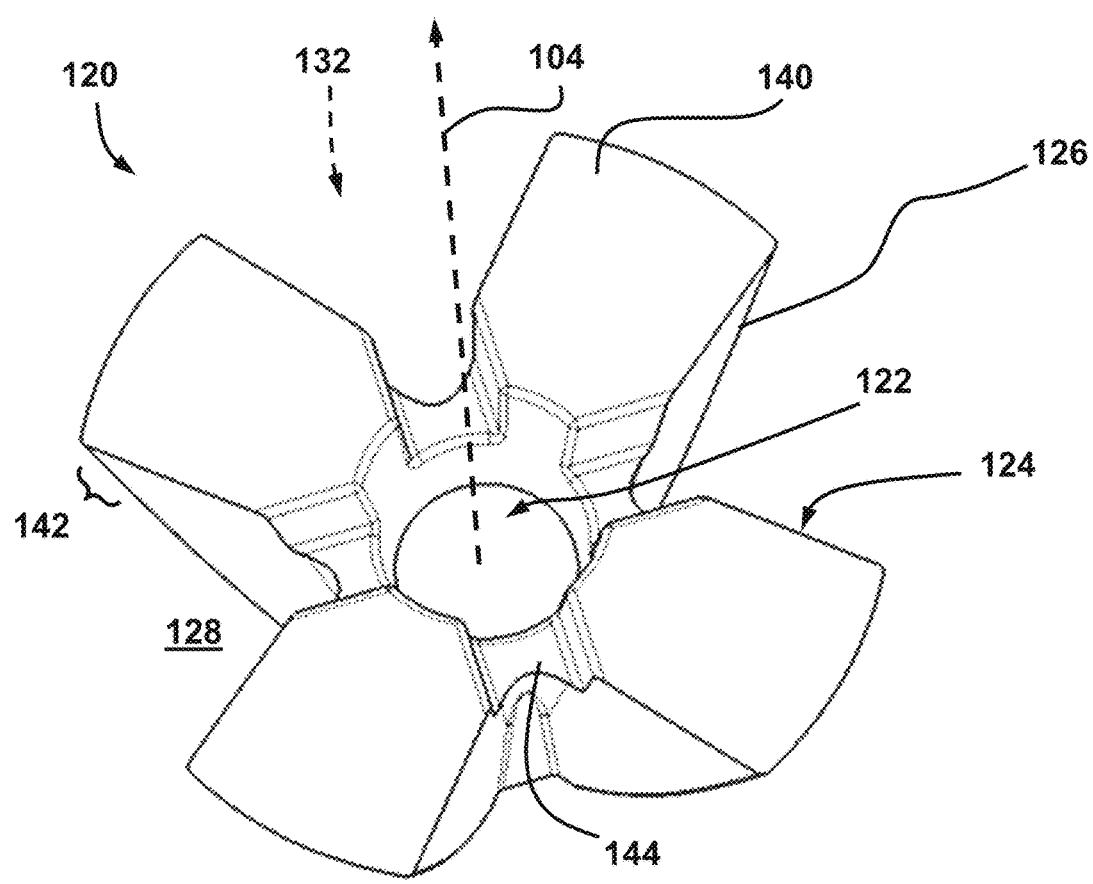
FIG. 1 is a front isometric view of an example of an illumination optic incorporating the proposed concept.

FIG. 1 is a front isometric view of an example of an illumination optic incorporating the proposed concept. This illumination optic is referred to as a collimator lens 120.

Figure 15:
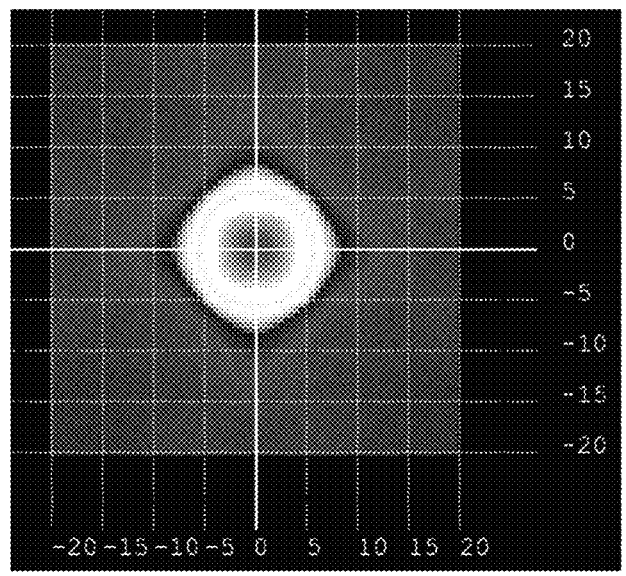
FIG. 15 depicts an example of a light projection on a target surface receiving light exiting through the front side of the diffusion lens in FIGS. 11 and 12.
Figure 16:
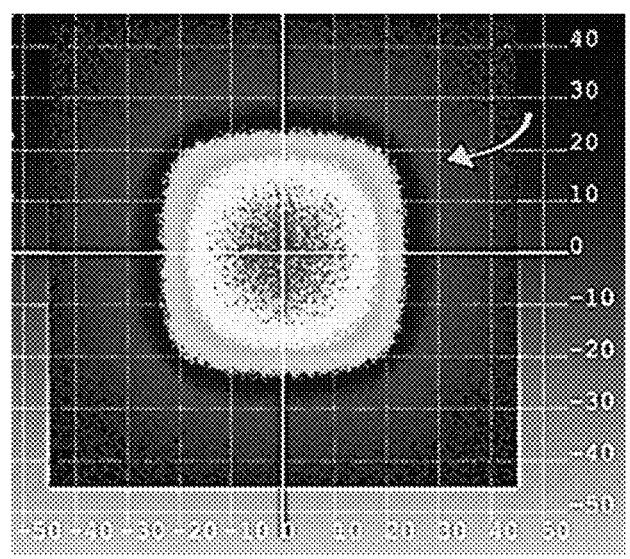
FIG. 16 depicts an example of the light projection on the target surface receiving light exiting through the front side of the diffusion lens when positioned as illustrated in FIGS. 13 and 14.

The collimator lens 120 is provided for conveying light rays coming from at least one light source 102 (FIG. 8) and that generally propagate along a central optical axis 104 so as to form a light projection 106, such as the ones shown in FIGS. 15 and 16. The collimator lens 120 has a rear side 130 and a front side 132. In use, light outputs the collimator lens 120 at its front side 132.

The collimator lens 120 has a solid monolithic structure and is made of a transparent material, such as a solidified moldable plastic resin material. Examples of materials include acrylic glass, polymethyl methacrylate, polycarbonate, silicon, cyclic olefin copolymer, and combination thereof. These materials general have an index of refraction between 1.42 and 1.65. Using a material having an index of refraction outside this range is also possible. Still, using other materials or even materials that are not plastics, including materials such as glass or others, is possible as well.

The collimator lens 120 includes a central core section 122 and a plurality of spaced-apart and longitudinally-extending side lobed segments 124. These lobed segments 124 are laterally disposed around the central core section 122. The example of FIG. 1 shows that the lobed segments 124 of the collimator lens 120 are axisymmetric with reference to the central optical axis 104. However, other configurations are possible, including some where the lobed segments 124 do not have an axisymmetric configuration. The illustrated example also has four lobed segments 124 and a cruciform layout. Using a different number of lobed segments 124 is possible as well. For instance, some implementations can include between three and eight while others could even have more than eight. Other variants are possible as well.

Each lobed segment 124 has a total internal refection (TIR) inner peripheral surface 126 extending between the rear side 130 and the front side 132 of the collimator lens 120. Some implementations can also use specular reflection instead of TIR but in general, TIR is preferred because it can reflect light with a 100% efficiency.

In the illustrated example, each TIR inner peripheral surface 126 extends uninterruptedly between the rear side 130 and the front side 132 of the collimator lens 120. Each TIR inner peripheral surface 126 also has a curved shape and, in the context of TIR, it is a concave surface for the refracted light impinging thereon. The curvature can be parabolic or circular in cross section. When the surfaces 126 are circular in shape, they can be concentric with the central optical axis 104. Other variants are also possible.

Each lobed segment 124 also has a light exit surface 140 located adjacent to the front side 132. In the illustrated example, the light exit surfaces 140 are planar and they extends perpendicular to the central optical axis 104. Variants are possible as well, as shown for instance in other figures. Still, each light exit surface 140 on the example of FIG. 1 is located on a projecting tip part 142 of the corresponding lobed segment 124. These projecting tip parts 142 extend beyond the central core section 122. They are separated from one another by intervening slots 144 extending radially from the central optical axis 104. These slots 144 can be configured and shaped differently in other implementations, or even be omitted entirely. They may useful for various reasons, such as to decrease the quantity of material, to save weight in the end product, to optimize cooling during the injection molding manufacturing process, or to provide space for other features, to name just a few. Other variants are possible.

As can be appreciated, the open exterior spaces 128 between the lobed segments 124 create multiple outer surfaces and since these surfaces are not the TIR inner peripheral surfaces 126, they can be used as mounting surfaces or for other purposes. The outer side of the TIR inner peripheral surfaces 126 must be surrounded by a medium, for instance ambient air. Using another medium is also possible as long as its refractive index, like air, is lower than that of the material forming the collimator lens 120. This allows the TIR to occur inside the lens. The TIR inner peripheral surfaces 126 are also separated from one another of the side by the medium filling the open exterior space 128 between the lateral walls of each lobed segment 124. The TIR inner peripheral surfaces 126 are thus disconnected from one another, unlike for instance circular lenses devoid of lobed segments.

Figure 2:
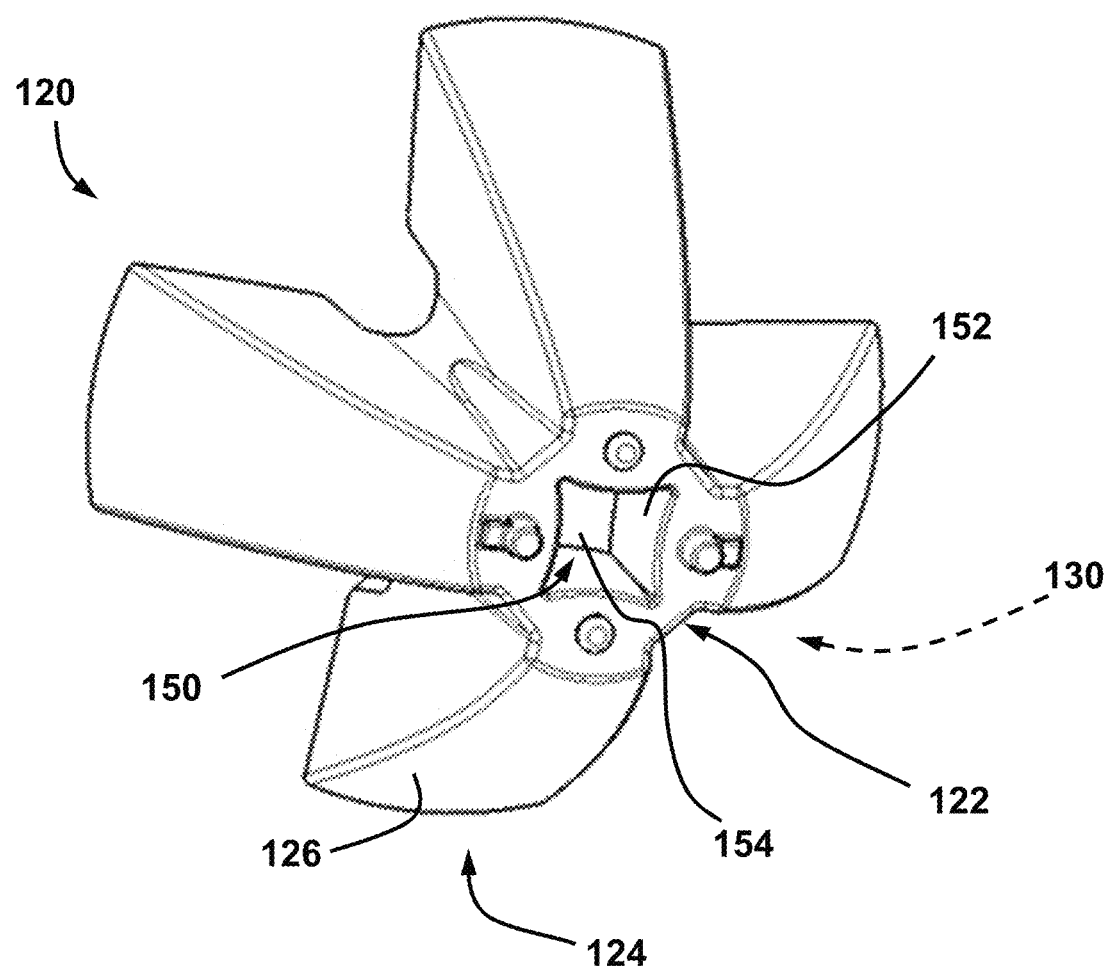
FIG. 2 is a rear isometric view of the collimator lens in FIG. 1.
Figure 3:
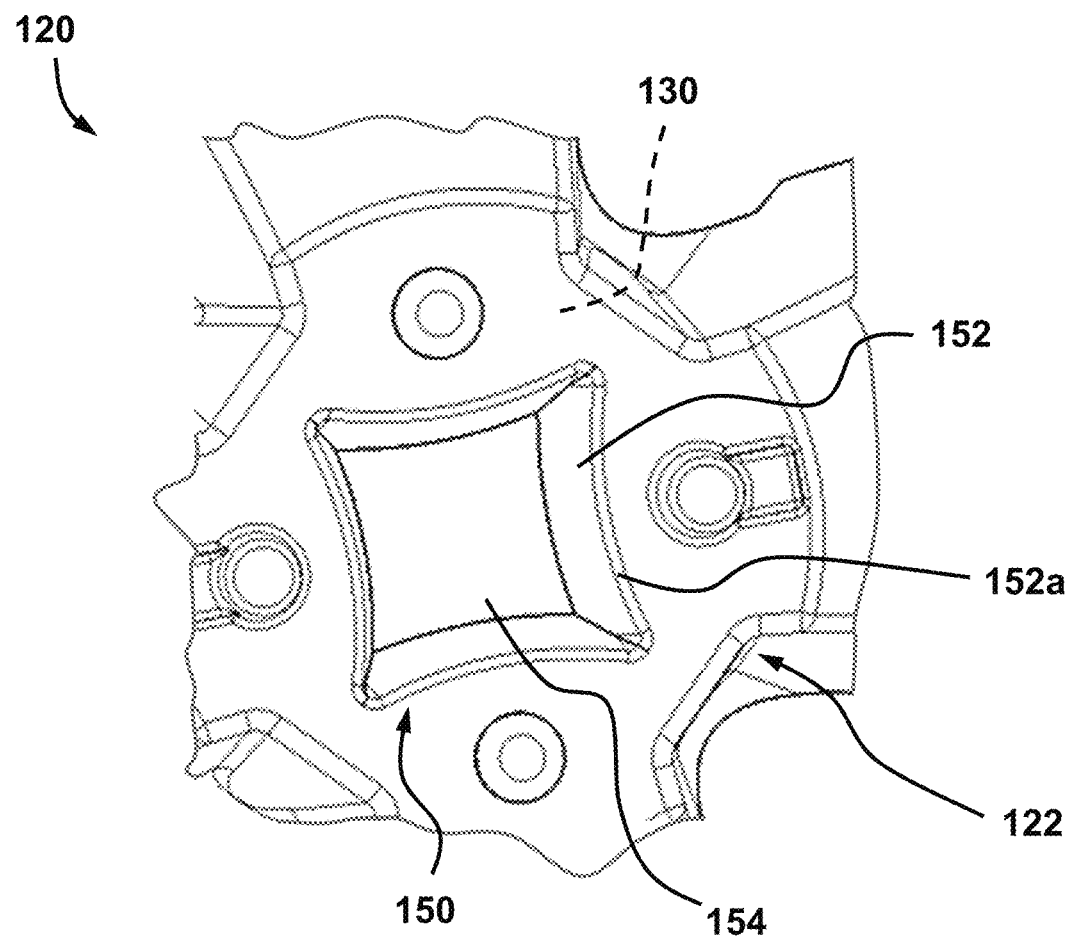
FIG. 3 is an enlarged view of the light entry cavity illustrated in FIG. 2.

The collimator lens 120 further includes a light entry cavity 150 located inside the central core section 122, as best shown in FIGS. 2 and 3. FIG. 2 is a rear isometric view of the collimator lens in FIG. 1. FIG. 3 is an enlarged view of the light entry cavity illustrated in FIG. 2.

The light entry cavity 150 is opened at the rear side 130 of the collimator lens 120. It also has a plurality of longitudinally-extending and distinct convex side wall surfaces 152. There is one side wall surface 152 for each one of the lobed segments 124. Thus, in the illustrated example, there are four of these side wall surfaces 152 and the light entry cavity 150 is concentric with the central optical axis 104. Each side wall surface 152 also has an edge 152a (FIG. 3) extending along the rear side 130 of the collimator lens 120. The side wall surfaces 152 are, in this implementation, distinct from one another since they have delimitations between them. Variants of this configuration are possible.

The light entry cavity 150 of the illustrated example also includes an end wall surface 154. This end wall surface 154, however, may be omitted in some implementations or may be configured differently compared to what is shown.

Figure 4:
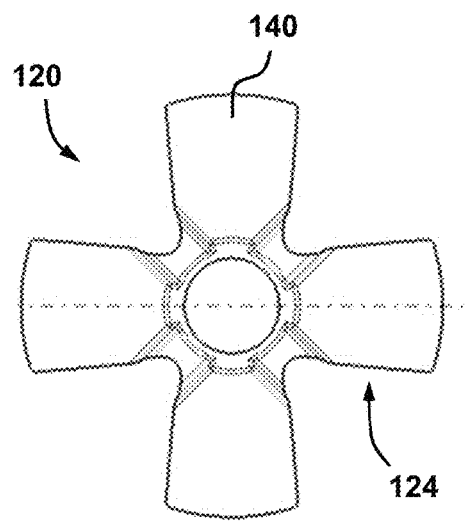
FIG. 4 is a front view of the collimator lens in FIG. 1.
Figure 5:
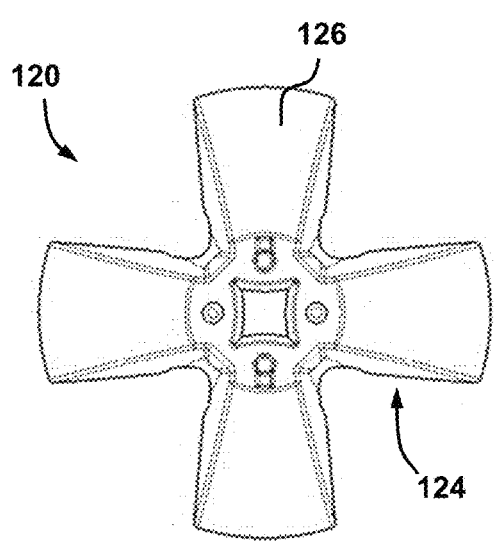
FIG. 5 is a rear view of the collimator lens in FIG. 1.
Figure 6:
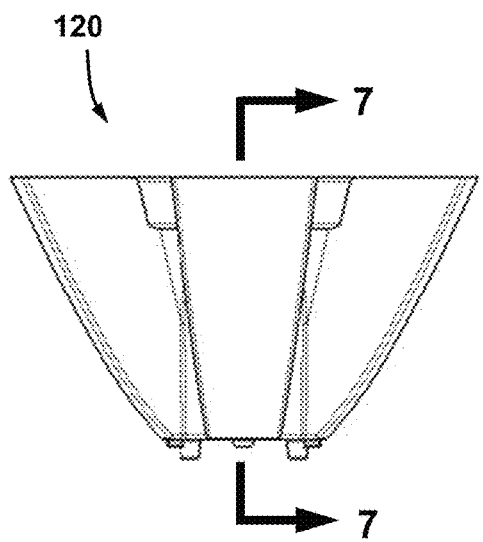
FIG. 6 is a side view of the collimator lens in FIG. 1.
Figure 7:
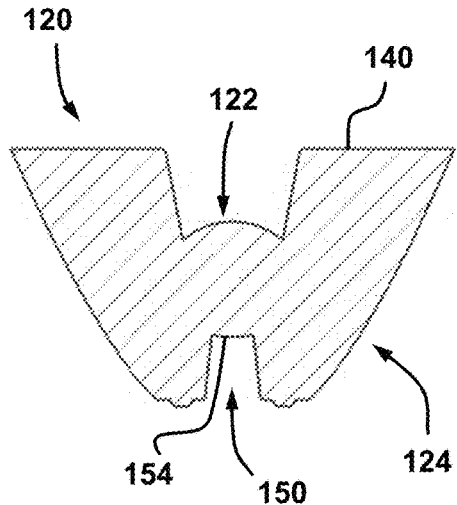
FIG. 7 is a cross section view taken along lone 7-7 in FIG. 6.

FIGS. 4 to 7 are additional views of the collimator lens 120 shown in FIG. 1. FIG. 4 is a front view thereof, FIG. 5 is a rear view thereof and FIG. 6 is a side view thereof. FIG. 7 is a cross section view taken along lone 7-7 in FIG. 6.

Figure 8:
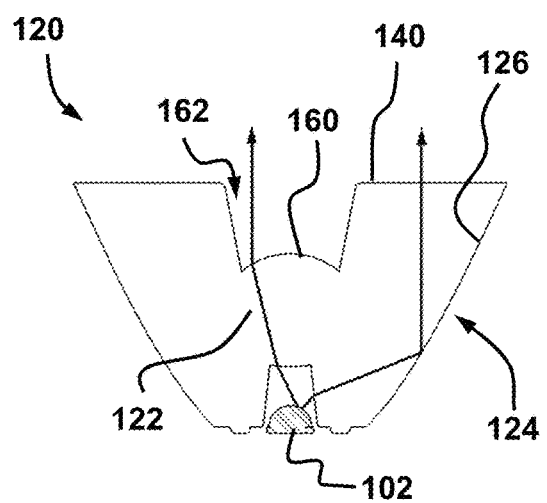
FIG. 8 is a semi-schematic cross section view similar to FIG. 7 but where a generic example of a light source is also shown.

FIG. 8 is a semi-schematic cross section view similar to FIG. 7 but where a generic example of a light source 102 is also shown. This light source 102 can be, for instance, a solid state light, such as a LED producing light in the visible spectrum. Other kinds of solid state lights can be used as well. Using non-solid state light sources is also possible and, in some implementations, the light source could also output light outside of the visible spectrum. Still, one can use two of more light sources instead of just one with the same collimator lens 120. Expressions such as "a light source", "the light source" or the like, even when used in a singular form, do not exclude this possibility.

Still, in FIG. 8, only two examples of light rays are depicted for the sake of explanation. As can be appreciated, each side wall surface 152 of the light entry cavity 150 is configured and disposed to collimate a portion of the light rays, coming from the light source 102, onto a corresponding one of the TIR inner peripheral surfaces 126. These light rays will then be reflected inside the collimator lens 120 towards a corresponding one of the light exit surfaces 140. FIG. 8 shows that some of the light rays pass through the end wall surface 154 and exit through a central light exit surface 160 located at a front end of the central core section 122. This central light exit surface 160 is located at the bottom of a central front cavity 162. This central front cavity 162 is circular in shape in the illustrated example but variants are possible. It may even be omitted in some implementations.

Figure 9:
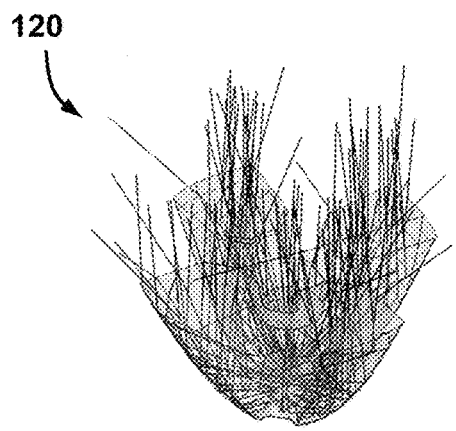
FIG. 9 is a semi-schematic isometric view depicting light exiting through the front side of the collimator lens in FIG. 8.
Figure 10:
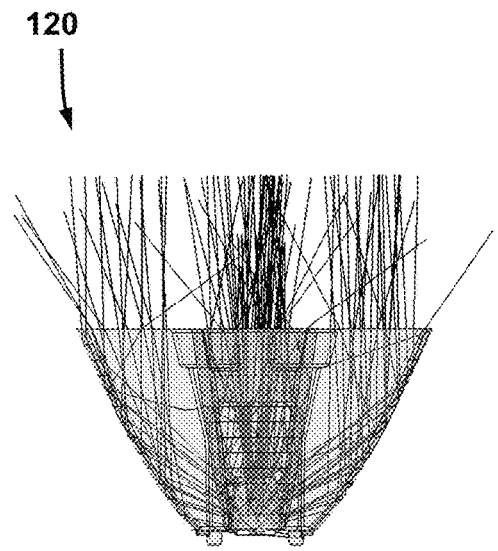
FIG. 10 is a side view of what is shown in FIG. 9.

FIG. 9 is a semi-schematic isometric view depicting light exiting through the front side 132 of the collimator lens 120 in FIG. 8. FIG. 10 is a side view of what is shown in FIG. 9.

Figure 11:
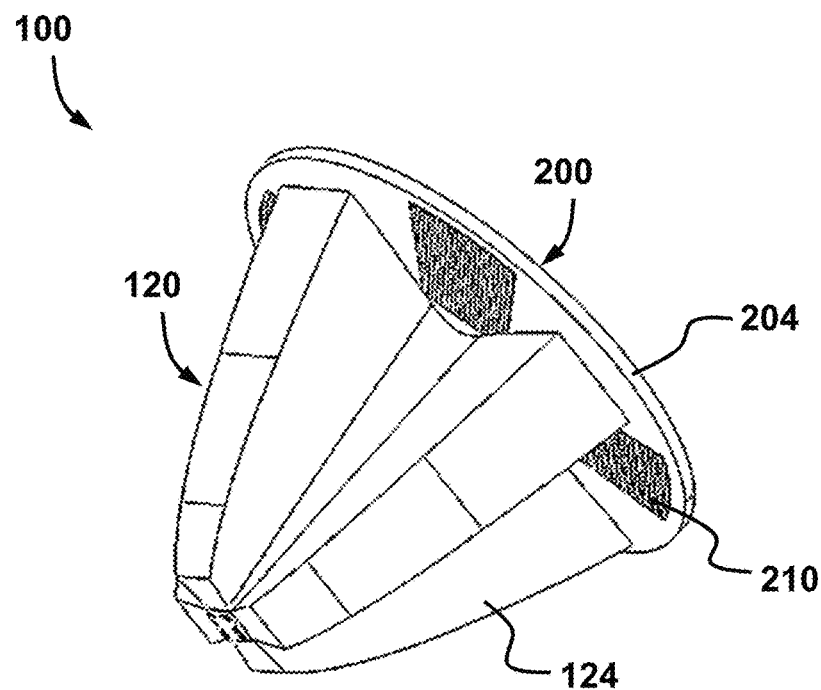
FIG. 11 is a rear isometric view of an example of an illumination device incorporating the proposed concept.
Figure 12:
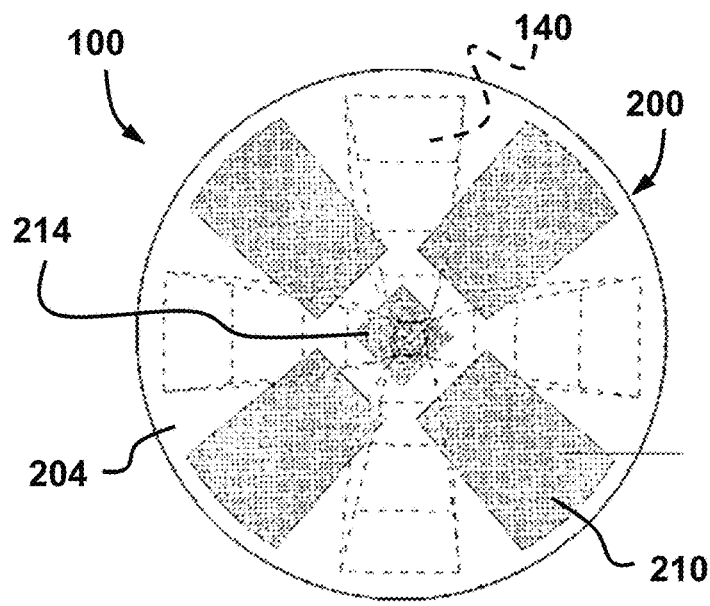
FIG. 12 is a front view of the illumination device in FIG. 11.

FIG. 11 is a rear isometric view of an example of an illumination device 100 incorporating the proposed concept. FIG. 12 is a front view of the illumination device 100 in FIG. 11. As can be seen, this illumination device 100 includes the collimator lens 120 and a diffusion lens 200. The collimator lens 120 can be, for instance, identical to the one illustrated in FIG. 1 but variants are also possible as well.

The center of the diffusion lens 200 is coaxial with the central optical axis 104. This diffusion lens 200 is also positioned next to the front side 132 of the collimator lens 120 to redirect light coming out of the light exit surfaces 140. In the illustrated example, the diffusion lens 200 is positioned at a fixed distance immediately next to the front side 132 of the collimator lens 120 and can only pivot around the central optical axis 104. Variants are possible as well.

In use, the diffusion lens 200 can pivot around the central optical axis 104, thereby changing the relative angular position between the collimator lens 120 and the diffusion lens 200. Depending on the implementation, this can also be achieved by mounting the collimator lens 120 on a pivoting arrangement while the diffusion lens 200 remains stationary. Some implementations could even include an arrangement where the collimator lens 120 and the diffusion lens 200 are both pivotable. Other variants are possible as well.

The diffusion lens 200 of the illustrated example is in the form of a planar disk-shaped element that extends radially with reference to the central optical axis 104. Variants are possible. For instance, the periphery of the diffusion lens 200 could be noncircular in some implementations. The diffusion lens 200 could also be nonplanar, for instance being conical in shape or having another kind of tridimensional shape. Other variants are also possible.

Figure 13:
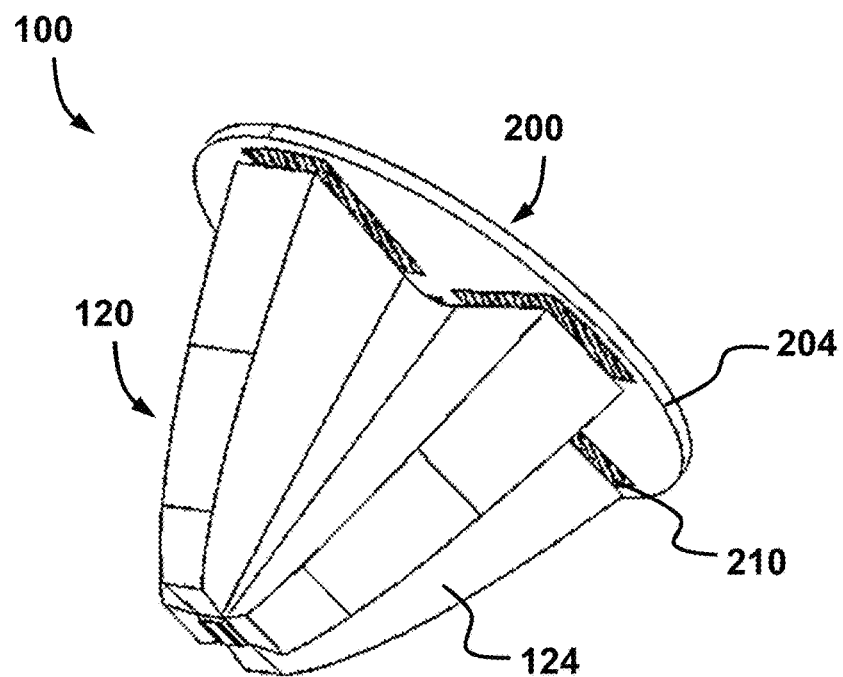
FIG. 13 is a rear isometric view of the illumination device in FIG. 11 but where the collimator lens and the diffusion lens are at a different angular position relative to one another.
Figure 14:
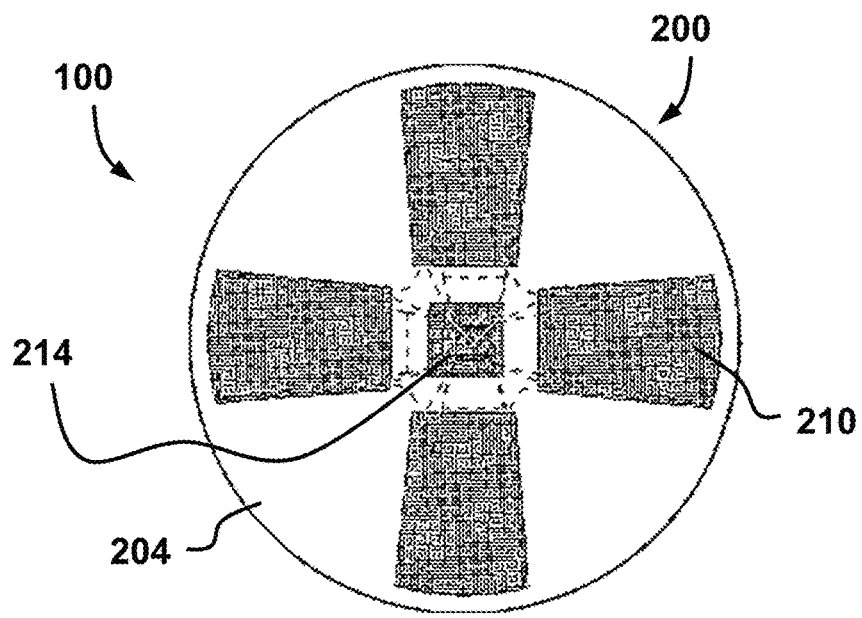
FIG. 14 is a front view of the illumination device as illustrated in FIG. 13.

The diffusion lens 200 of the illustrated example includes a main body 204 made of a transparent material and that is used as a substrate for supporting a plurality of outlying optical regions 210 disposed around the central optical axis 104. There is at least one region 210 for each light exit surface 140 and since there are four light exit surfaces 140, there are four regions 210. Each of them can be selectively positioned in or out of alignment with the light exit surfaces 140 of the collimator lens 120, depending on the relative angular position between the collimator lens 120 and the diffusion lens 200. FIGS. 11 and 12 illustrate a first position where the outlying optical regions 210 are almost entirely out of registry with corresponding light exit surfaces 140. A second position is illustrated in FIGS. 13 and 14. FIG. 13 is a rear isometric view of the illumination device 100 in FIG. 11 but where the collimator lens 120 and the diffusion lens 200 are at a different angular position relative to one another. FIG. 14 is a front view of the illumination device 100 as illustrated in FIG. 13.

The four outlying optical regions 210 in the illustrated example are somewhat rectangular in shape and they include micro-optical elements 220. These regions 210 are spaced-apart from one another, meaning that most of their lateral sides are spaced-apart from adjacent outlying optical regions 210. They are shown as being completely detached from one another but in some implementations, they can, for instance, be in contact to one another at the center of the diffusion lens 200, or be all connected at a central area. The regions 210 are said to be optical, meaning that they are refracting light and not simply blocking the light.

In the illustrated example, the intervening spaces between adjacent regions 210 are simply transparent portions of the main body 204. The diffusion lens 200 of the illustrated example also includes a distinct central region 214. This central region 214 is positioned right above the central core section 122 and receives light therefrom. This central region 214 can be integrated with the other regions 210. Some implementations may have no or very little light coming out of the central core section 122 and as a result, the central region 214 can be omitted or even be non-optical, for instance be an opaque surface. Other variants are possible as well.

In use, most of the light coming out the collimator lens 120 will pass through the diffusion lens 200 and the light refraction will depend on where the regions 210 are located, thus on the relative angular position between them. FIGS. 11 and 12 show a first position where most of the light coming from the light exit surfaces 140 of the collimator lens 120 will pass through the transparent portions on the main body 204. In FIGS. 13 and 14, most of the light coming from the light exit surfaces 140 of the collimator lens 120 will pass through the regions 210. The small proportion of the light rays coming out of the central core section 122 of the collimator lens 120 will mostly go through the central region 214, regardless of the relative angular position.

FIG. 15 depicts an example of a light projection on a target surface receiving light exiting through the front side of the diffusion lens 200 in FIGS. 11 and 12. FIG. 16 depicts an example of the light projection on the target surface receiving light exiting through the front side of the diffusion lens 200 when positioned as illustrated in FIGS. 13 and 14. As can be seen, there is a variation of the size and of the overall shape of the light projection between the first position and the second position. This variation is incremental since the relative angular position can be also be set anywhere between the first and the second position. This creates a zooming effect or a variable focus effect without axially displacing one of the illumination optics or the light source. Such results would not be possible using a conventional circular lens.

It should be noted that the light projection examples depicted in FIGS. 15 and 16 are only for the sake of explanation. The actual light projections, including the way they vary depending on the relative angular position, can be different from what is depicted.

Figure 17:
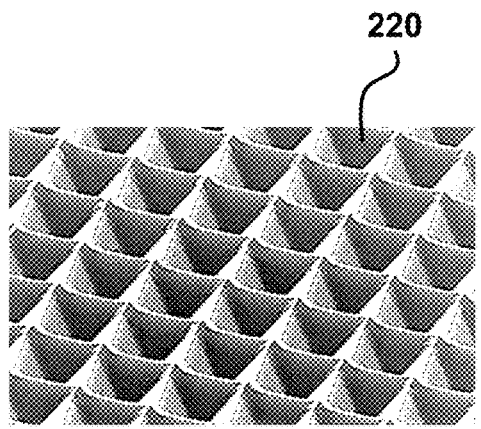
FIGS. 17 to 19 depict a few generic examples of micro-optical elements for use on a diffusion lens or on the collimator lens.
Figure 18:
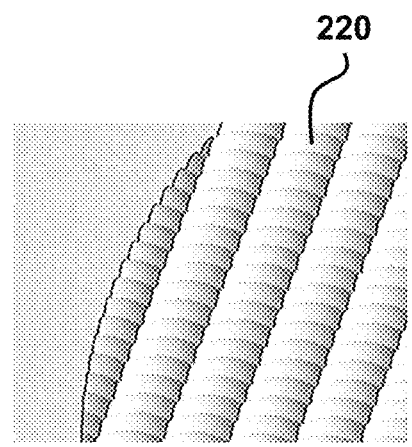
Figure 19:
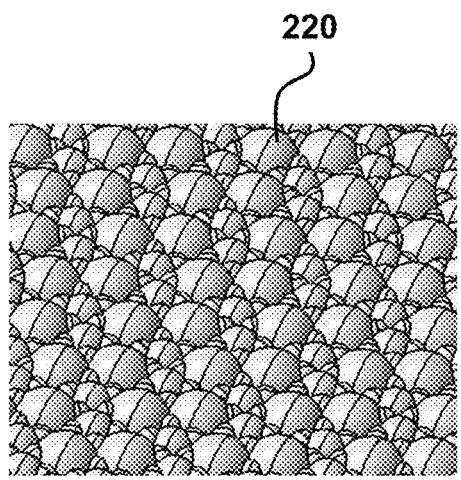

FIGS. 17 to 19 depict a few generic examples of micro-optical elements 220 for use on a diffusion lens, such as the one shown in FIGS. 11 to 14, or on the collimator lens 120.

These micro-optical elements 220 are generally very small and may even not be seen with a naked eye. They can be convex or concave with reference to the light passing through them, depending on the needs and other factors. These micro-optical elements 220 provide a diffusing effect on the light rays when the light rays are received from the collimator lens 120.

The micro-optical elements 220 can be, for instance, in the form of lenslets, micro-lenses, micro-prisms, micro-cylinders and/or textured surfaces, to name just a few. FIG. 17 depicts an example of an array of micro-optical elements 220 that are in the form of micro-prisms. FIG. 18 depicts an example of an array of micro-optical elements 220 that are in the form of micro-lenses. FIG. 19 depicts an example of micro-optical elements 200 of different sizes that were machined to form a hexagonal pattern. Other kinds of micro-optical elements 220 are possible as well.

Figure 20:
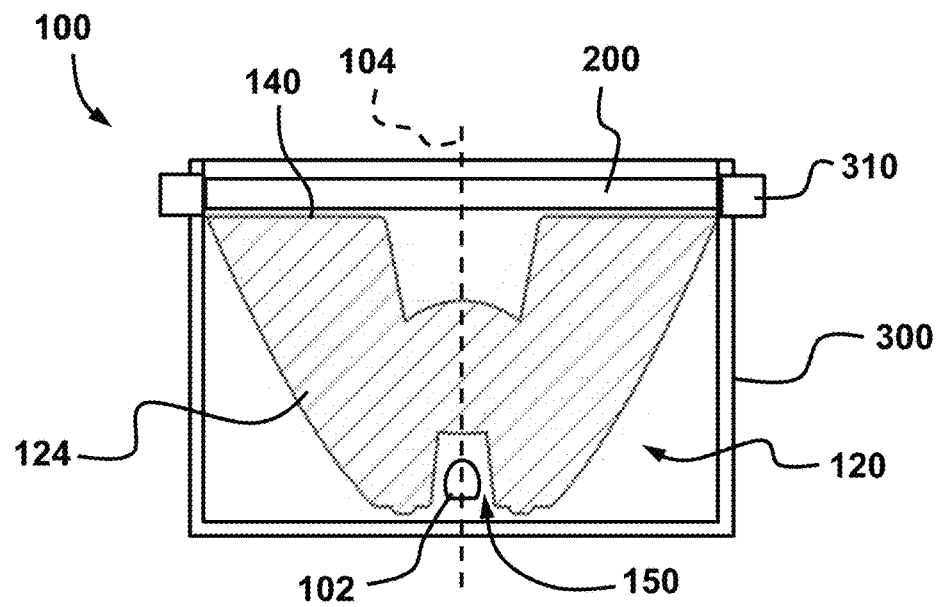
FIG. 20 is a semi-schematic view depicting a generic example of a housing for the illumination device.

FIG. 20 is a semi-schematic view depicting a generic example of a housing 300 for the illumination device 100. This illumination device 100 can be, for instance, a light bulb for a general lighting application. Many other implementations are possible as well. In FIG. 20, the illumination device 100 includes a collimator lens 120 that is stationary, a light source 102 positioned adjacent to the rear side 130 of the collimator lens 120, and a diffusion lens 200 provided in front of the collimator lens 120. In this example, the collimator lens 120 is mounted on a pivotable ring 310 attached to the housing 300 and that can be manually pivoted by a user to change the angular position of the diffusion lens 200. The upper side of the housing 300 can be closed by a protective lens or be left open, depending on the implementation.

Figure 21:
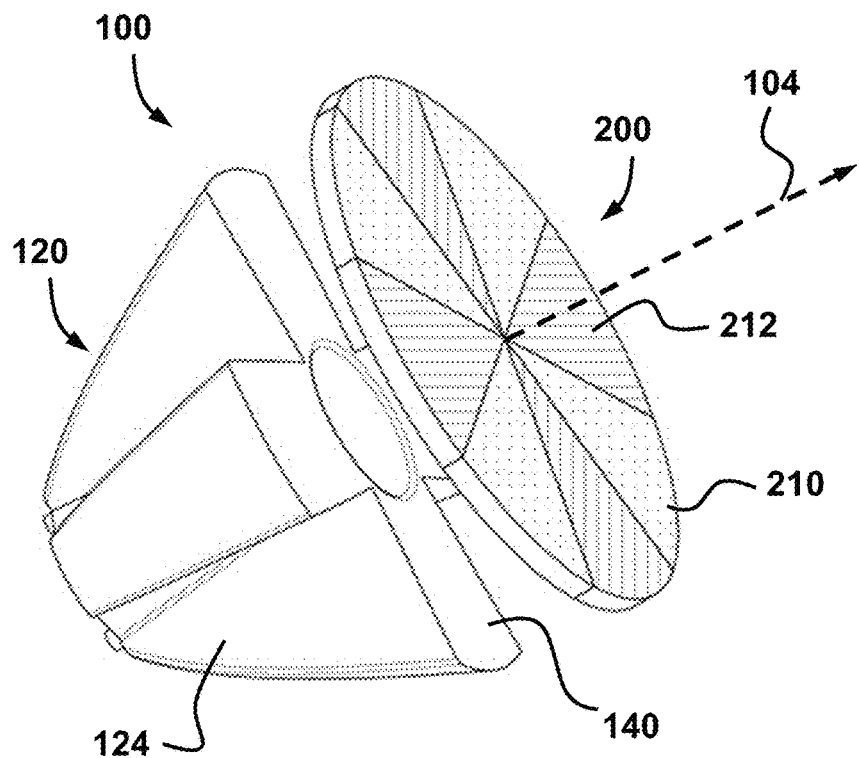
FIG. 21 is a rear isometric view illustrating another example of an illumination device incorporating the proposed concept.

FIG. 21 is a rear isometric view illustrating another example of an illumination device 100 incorporating the proposed concept. This example includes a diffusion lens 200 having a plurality of sector-shaped outlying optical regions 210, 212 covering the entire surface. These regions 210, 212 have an axisymmetric configuration but other configurations are possible as well. For instance, if the lobed segments 124 are not axisymmetric with reference to the central optical axis 104, the outlying optical regions 210, 212 could be arranged differently compared to what is shown. The number of first regions 210 and the number of second regions 212 each match the number of lobed segments 124. These regions 210, 212 can also be subdivided themselves.

Figure 22:
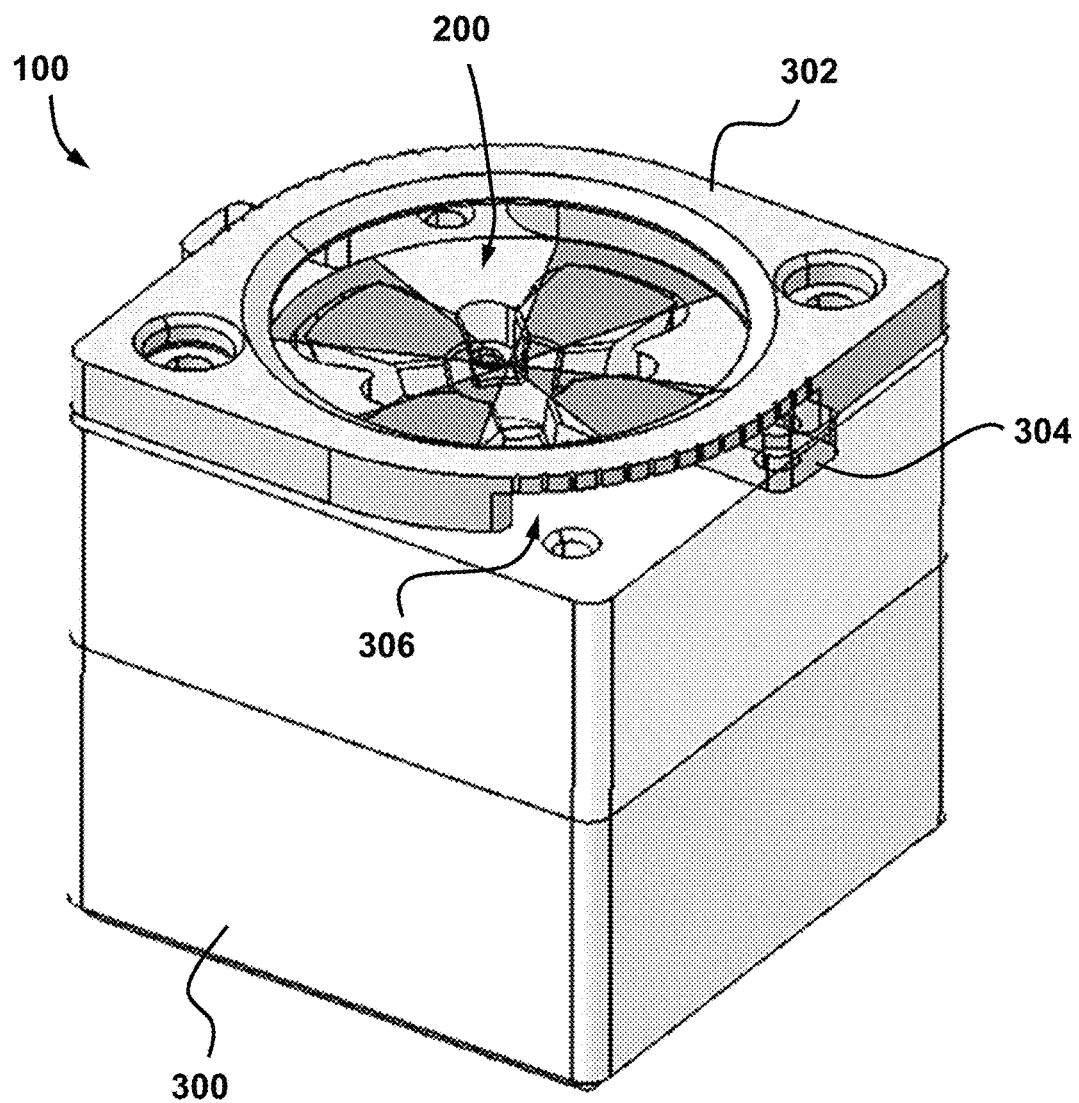
FIG. 22 is a front isometric view of a working example of an illumination device incorporating the proposed concept.

FIG. 22 is a front isometric view of a working example of an illumination device 100 incorporating the proposed concept. This example includes a housing 300 over which a mounting plate assembly 302 is bolted to pivotally mount the diffusion lens 200 in front of a collimator lens located inside the housing 300. The mounting plate assembly 302 has a central opening allowing light from the diffusion lens 200 to exit. The diffusion lens 200 can be pivoted over a range of about 45 degrees using one of the two oppositely-disposed side tabs 304 in this example. The side tabs 304 can be moved within a corresponding arc-shaped slot 306. Variants are possible as well.

It should be noted that if desired, one can design the illumination device 100 with a motorized mechanism to change the relative angular position of the diffusion lens 200 with reference to the collimator lens 120, or vice-versa. This motorized mechanism can be manually or automatically controlled, or even be both manually and automatically controlled. Automatic control can involve using signals from sensors or from other devices to determine the relative angular position of the illumination optics inside the illumination device 100. Other variants are possible as well.

Furthermore, while the main goal of an arrangement such as the mounting plate assembly 302 is to change the relative angular position between the collimator lens 120 and the diffusion lens 200, some implementations may include an arrangement where the diffusion lens 200 could also be movable along the central optical axis 104 in addition to the possibility of changing the relative angular position. The two motions can be independent from one another, or be simultaneous, for instance be helical or the like. The light source 102 may also be movable as well. Other variants are possible.

Figure 23:
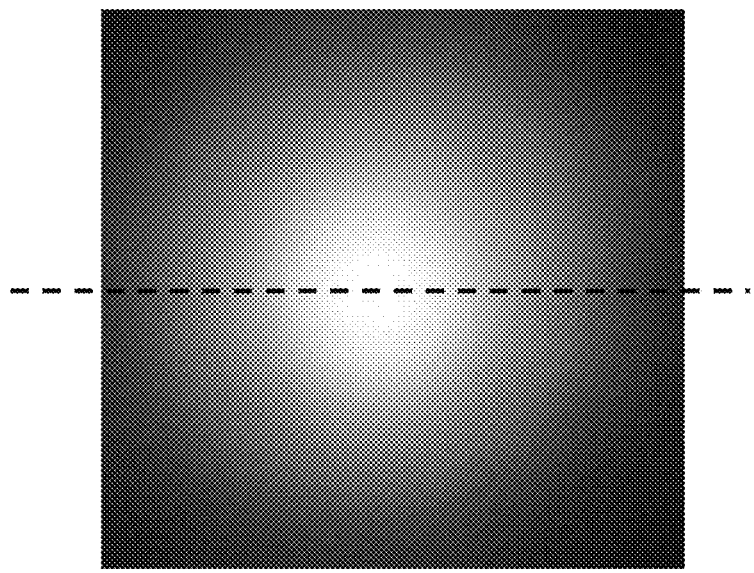
FIG. 23 depicts an example of a light projection on a target surface receiving light from the illumination device in FIG. 22 when set at a spot (narrow) beam position.
Figure 24:
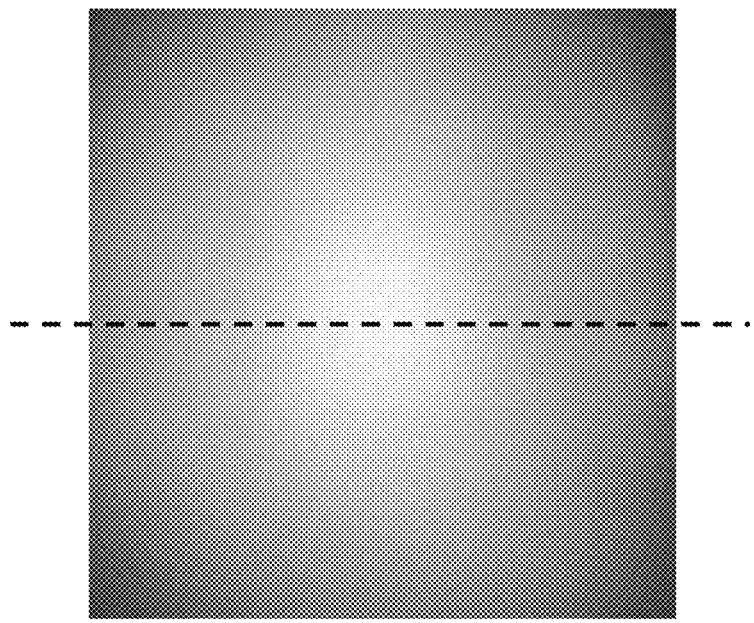
FIG. 24 is a view similar to FIG. 23 but depicts, for the sake of comparison, an example of the light projection where the illumination device in FIG. 22 is set at a flood (wide) beam position.

FIG. 23 depicts an example of a light projection on a target surface receiving light from the illumination device 100 in FIG. 22 when set at a spot (narrow) beam position. FIG. 24 is a view similar to FIG. 23 but depicts, for the sake of comparison, an example of the light projection where the illumination device in FIG. 22 is set at a flood (wide) beam position.

Figure 25:
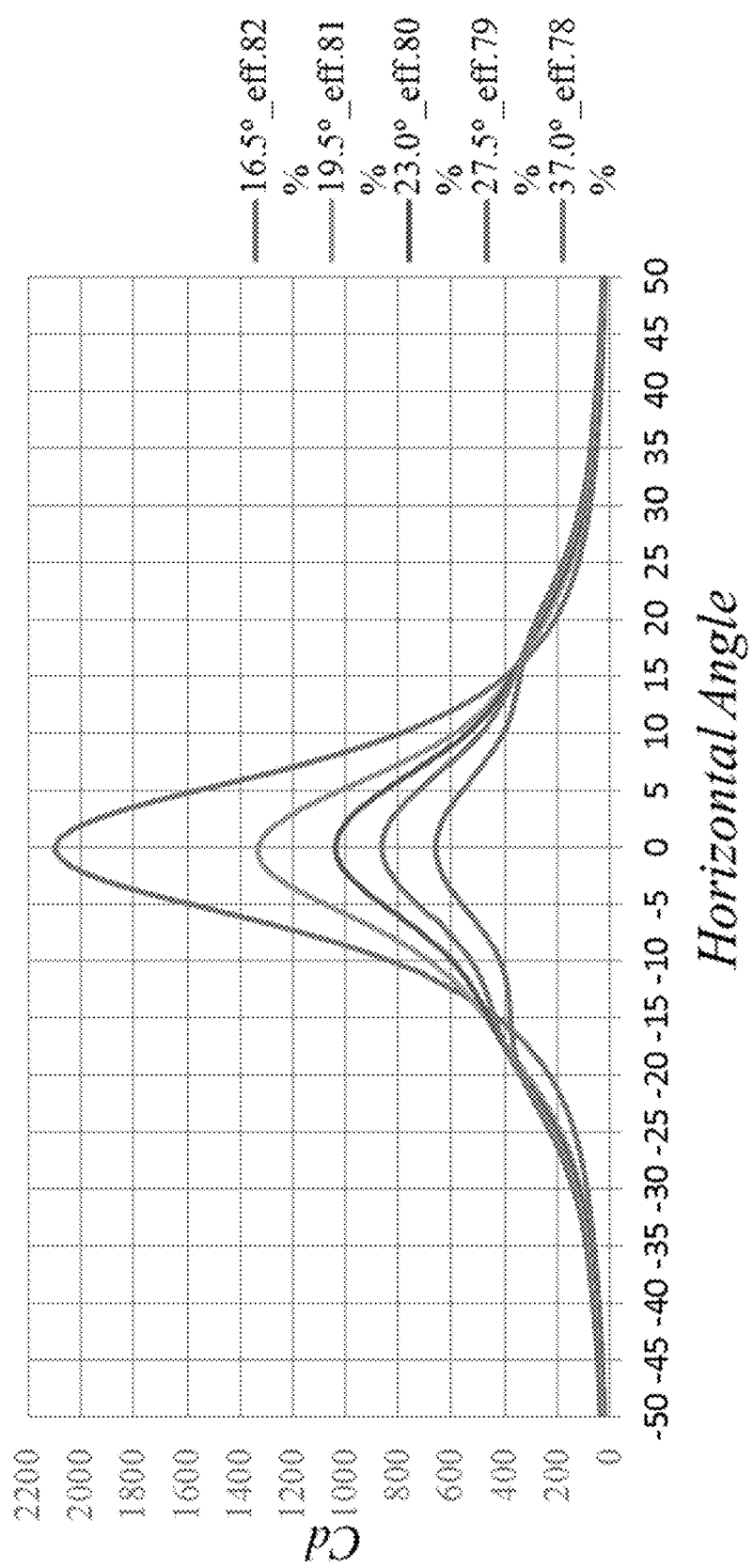
FIG. 25 is an example of a graph of the light output with reference to the horizontal angle for the illumination device in FIG. 22.

FIG. 25 is an example of a graph of the light output (in candelas) with reference to the horizontal angle for the illumination device 100 in FIG. 22. At the center position in the graph (0 degree), the line at the top corresponds to what is shown in FIG. 23, namely to the spot (narrow) beam position, and the line at the bottom corresponds to what is shown in FIG. 24, namely to the flood (wide) beam position. The measurements follow the stippled reference lines shown in FIGS. 23 and 24.

Figure 26:
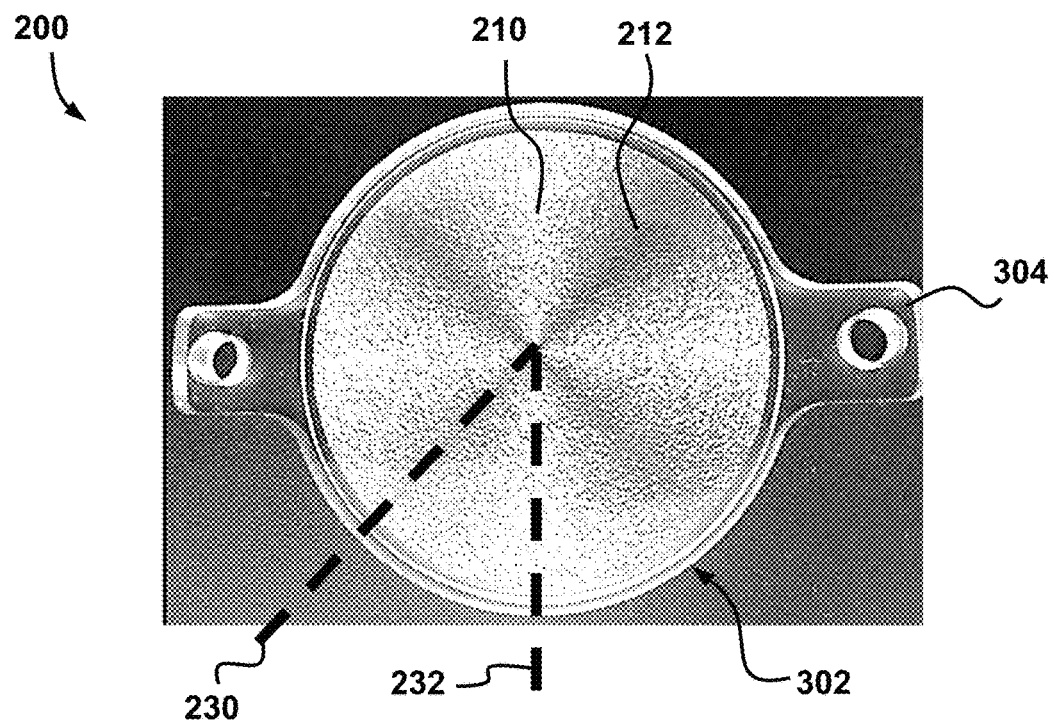
FIG. 26 is a front view depicting an example of a diffusion lens having a variable machined texture with a smooth gradient transition over the range of angular positions.

FIG. 26 is a front view depicting an example of a diffusion lens 200 having a variable machined texture with a smooth gradient transition over the range of angles. This texture is formed by micro-optical elements, for instance micro-optical elements. They may even have a specular finish to minimize losses. The micro-optical elements are about 100 microns in scale on the illustrated example but other dimensions are possible as well. They were molded on a thermoplastic material, such as polymethyl methacrylate or polycarbonate. Other materials are possible as well. In FIG. 26, the darker areas (such as the one marked by stippled line 230) correspond to the narrow beam position and the lighter ones (such as the one marked by stippled line 232) correspond to the wide beam position.

Figure 27:
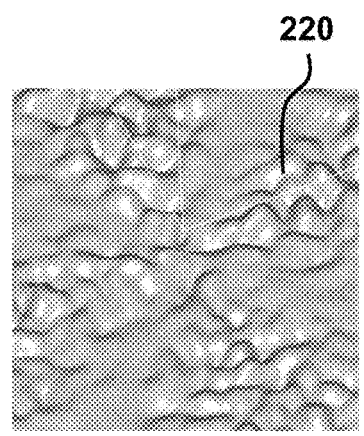
FIG. 27 is an enlarged view depicting an example of micro-optical elements at the center of the diffusion lens in FIG. 26.

FIG. 27 is an enlarged view depicting an example of micro-optical elements at the center of the diffusion lens 200 in FIG. 26.

FIGS. 28 and 29 are schematic views depicting the general outline of a light projection having a variable size depending on the relative angular position between the collimator lens 120 and the diffusion lens 200. FIG. 28 depicts a spot (narrow) beam position, as shown for instance in FIGS. 15 and 23. FIG. 28 depicts a flood (wide) beam position, as shown for instance in FIGS. 16 and 24. The stippled lines represents the area where most of the light rays are concentrated.

FIGS. 30 and 31 are schematic views depicting the general outline of a light projection having a variable orientation depending on the relative angular position between the collimator lens 120 and the diffusion lens 200. They illustrate that changing the relative angular position between the collimator lens 120 and the diffusion lens 200 is not limited to changing the size of the light projection. One can design the diffusion lens 200 to change the orientation of a noncircular light projection, as shown for instance in FIGS. 32 and 33. FIGS. 32 and 33 are schematic views depicting the general outline of a light projection having both a variable shape and size depending on the relative angular position between the collimator lens 120 and the diffusion lens 200. Still, other possibilities exist as well.

Figure 34:
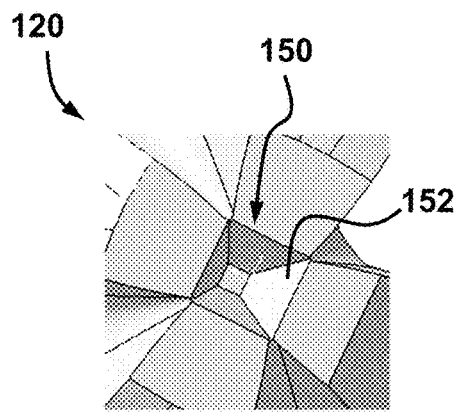
FIGS. 34 and 35 are enlarged rear isometric views depicting other examples of light entry cavities for the collimator lens in the illumination device.
Figure 35:
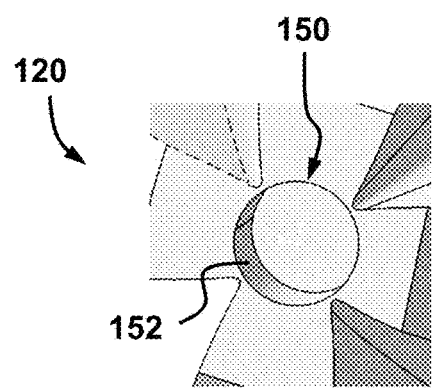

FIGS. 34 and 35 are enlarged rear isometric views depicting other examples of light entry cavities 150 for the collimator lens 120 to be used in the illumination device 100. In FIG. 34, the side wall surfaces 152 are planar, thus not convex or otherwise curved. In FIG. 35, the light entry cavity 150 includes a single side wall surface 152 that is circular. Other variants for the light entry cavity 150 are possible as well.

Figure 36:
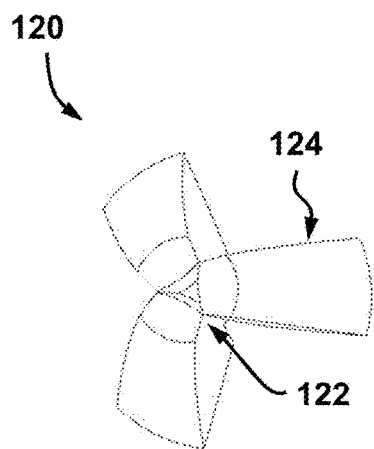
FIGS. 36 and 37 are rear isometric views depicting other examples of collimator lenses for use in the illumination device.
Figure 37:
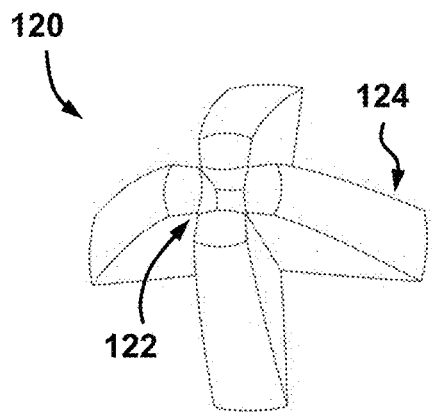
Figure 38:
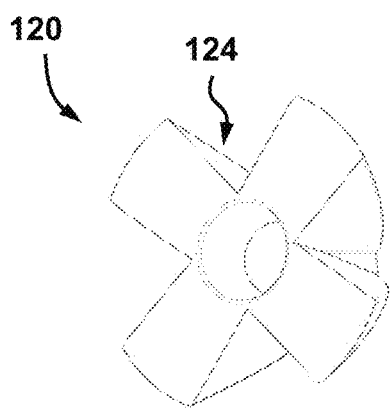
FIGS. 38 to 45 are front isometric views depicting other examples of collimator lenses for use in the illumination device.
Figure 39:
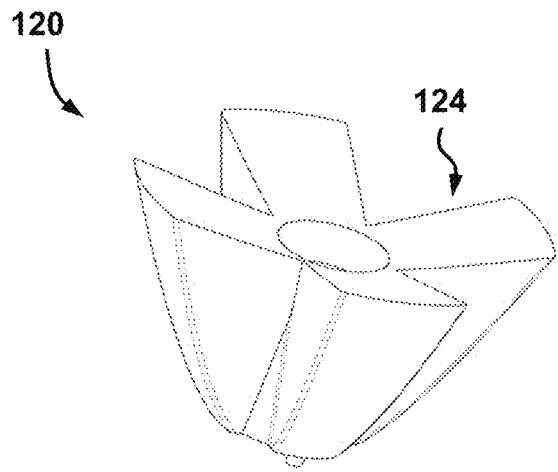
Figure 40:
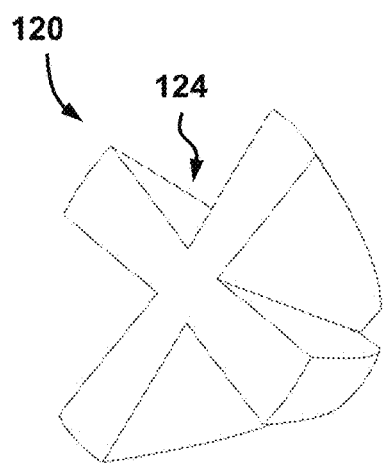
Figure 41:
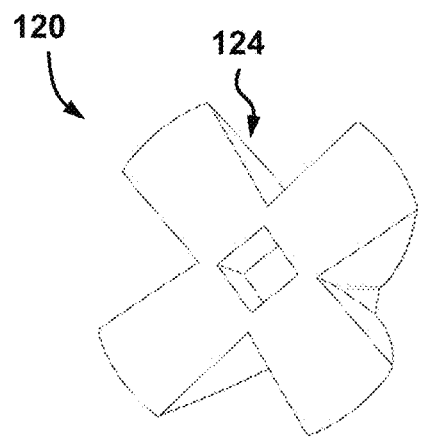
Figure 42:
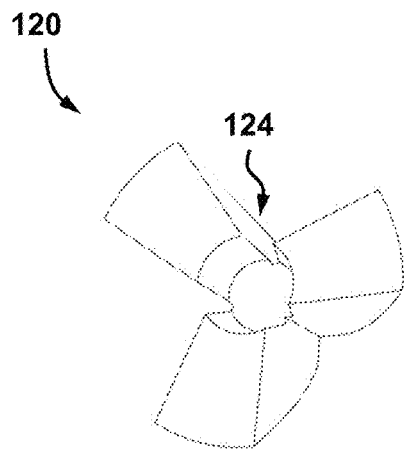

FIGS. 36 and 37 are rear isometric views depicting other examples of collimator lenses 120 for use in the illumination device 100. FIG. 36 has three lobed segments 124 and in FIG. 37, the four lobed segments 124 have lateral outer wall surfaces meeting at right angles adjacent to the central core section 122.

Figure 43:
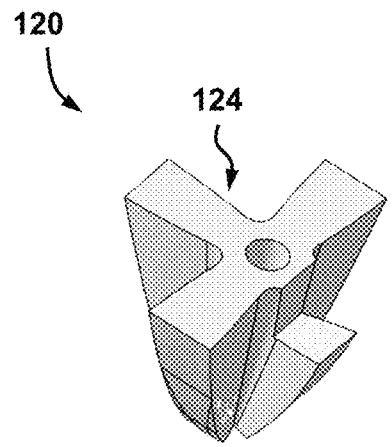
Figure 44:
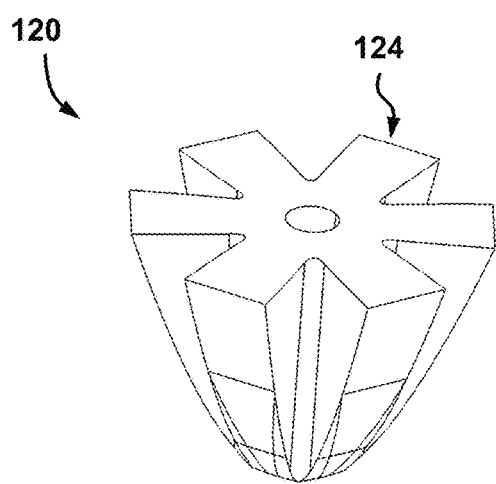
Figure 45:
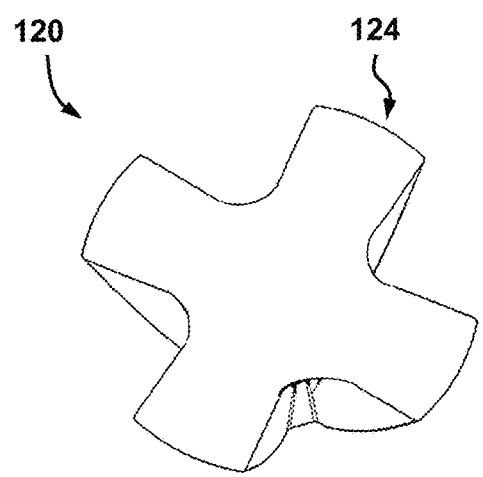

FIGS. 38 to 45 are front isometric views depicting other examples of collimator lenses 120 for use in the illumination device 100. Among other things, FIG. 43 shows an implementation where the collimator lens 120 has one lobed segment 124 shorter than the others. FIG. 44 shows a collimator lens 120 with eight lobed segments 124.

Figure 46:
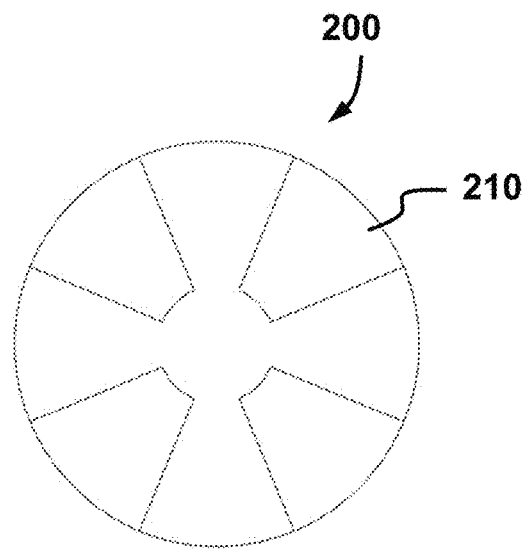
FIGS. 46 and 47 are front views depicting other examples of diffusion lenses for use in the illumination device.
Figure 47:
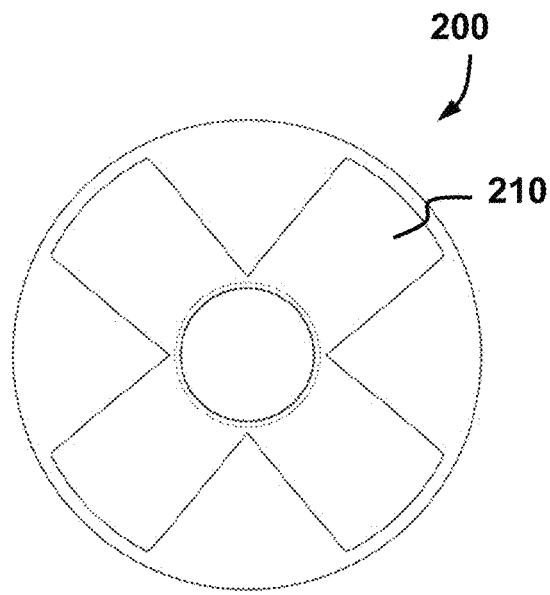

FIGS. 46 and 47 are front views depicting other examples of diffusion lenses 200 for use in the illumination device 100.

It should be noted that the few examples depicted in FIGS. 34 to 47 are not an exhaustive list of variants and that other variants can be devised as well.

Figure 48:
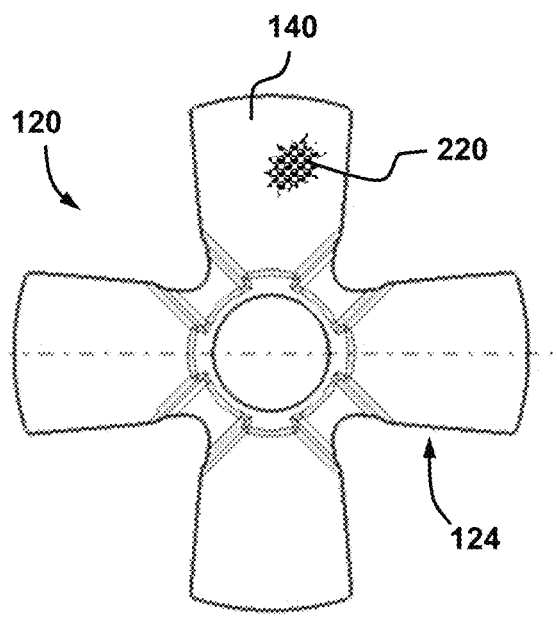
FIGS. 48 and 49 are views similar to FIGS. 4 and 5, respectively, and depicting an implementation where the light exit surfaces or the TIR inner peripheral surfaces include micro-optic elements.
Figure 49:
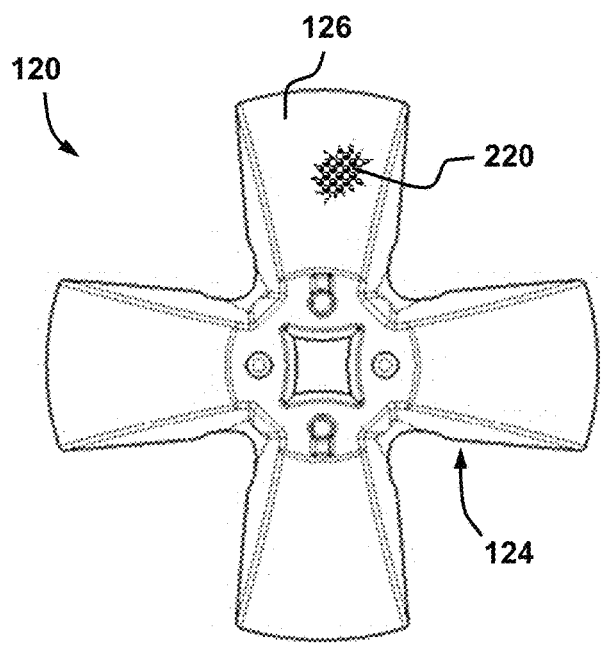
Figure 50:
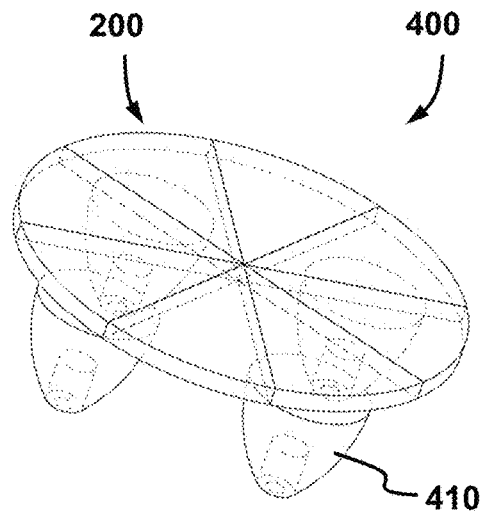
FIGS. 50 to 53 depict an illumination arrangement using a collimator lens and an array of four spaced-apart lenses, each lens having a corresponding light source.
Figure 51:
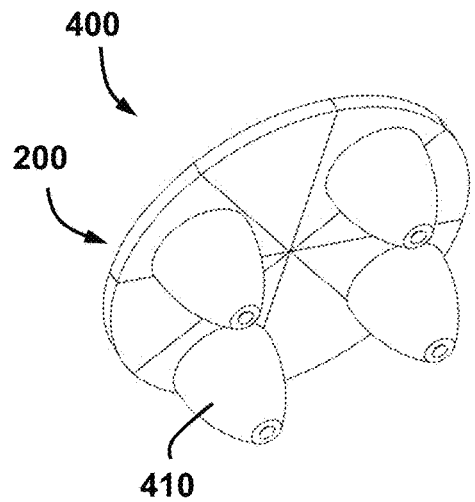
Figure 52:
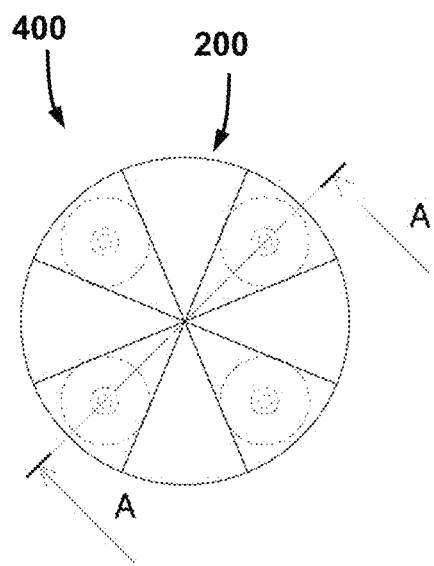

FIGS. 48 and 49 are views similar to FIGS. 4 and 5, respectively, and depicting an implementation where the light exit surfaces 140 or the TIR inner peripheral surfaces 126 include micro-optic elements 220. The micro-optic elements 220 are only partially shown and are not to scale. What is shown in FIGS. 48 and 49 is only for the sake of explanation. The micro-optic elements 220 can cover different areas of the surfaces 126, 140. They need not necessarily to be identical everywhere or be symmetric. One can also design a collimator lens 120 where micro-optic elements 220 are present at least partially on both the light exit surfaces 140 and on the TIR inner peripheral surfaces 126.

Figure 53:
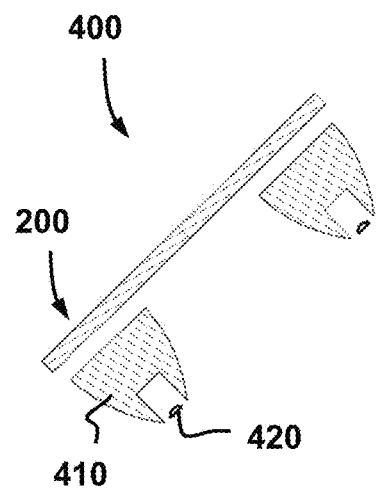

FIGS. 50 to 53 depict an illumination arrangement 400 using a collimator lens 200 and an array of four spaced-apart lenses 410, each lens 410 having a corresponding light source 420 (FIG. 53). These lenses 410 can have a simpler design compared to that of the collimator lens 210 and may even involve no internal reflection, either TIR or specular reflection. The collimator lens 200 can pivot around a central axis. This illumination arrangement 400 can be useful in certain applications. Variants of this design are possible as well, including some where the parts are not axisymmetric as shown.

The present detailed description and the appended figures are meant to be exemplary only, and a skilled person will recognize that variants can be made in light of a review of the present disclosure without departing from the proposed concept. Among other things, when terms such as perpendicular, parallel, radial or the like are used, these terms refer to an angle being substantially perpendicular, substantially parallel, substantially radial, etc. Thus, even without any adjective or adverbs, these terms do not necessarily require a high degree of precision and, unless otherwise indicated, they must be understood as including design variants or manufacturing tolerances that are, for instance, of ±20 degrees. They may also be, for instance, ±10 degrees in precision, or even ±5 degrees, depending on the specific context. These design variants or manufacturing tolerances would fall within the intended definitions. Likewise, when shape-related terms such as planar, flat, disk-shaped and the like, these terms refer to something that is substantially planar, substantially flat, substantially disk-shaped, etc. The same principle applies to many other terms and expressions through the entire specification. Words such as "substantially" and the like were generally omitted for the sake of legibility.

LIST OF REFERENCE NUMERALS

100 illumination device
102 light source
104 central optical axis
106 variable light projection
120 collimator lens
122 central core section
124 lobed segment
126 TIR inner peripheral surface
128 open exterior space
130 rear side
132 front side
140 light exit surface
142 projecting tip part
144 slot
150 light entry cavity
152 side wall surfaces
154 end wall surface
160 central light exit surface
162 central front cavity
200 diffusion lens
204 main body
210 first outlying optical region
212 second outlying optical region
214 central optical region
220 micro-optic elements
230 narrow beam position
232 wide beam position
300 housing
302 mounting plate assembly
304 side tab
306 arc-shaped slot
310 pivotable ring
400 illumination arrangement
410 lens
420 light source

What is claimed is:

1. A collimator lens for conveying light rays coming from a light source and that are generally propagating along a central optical axis so as to form a light projection, the collimator lens having a solid monolithic structure and made of a transparent material having a first refractive index, the collimator lens having a rear side and a front side, the collimator lens including:

a central core section;

a plurality of spaced-apart and longitudinally-extending side lobed segments laterally disposed around the central core section, each lobed segment having a TIR inner peripheral surface extending from the rear side towards the front side of the collimator lens, and having a light exit surface generally facing the front side, the TIR inner peripheral surfaces being separated from one another by a medium having a second refractive index that is lower than the first refractive index; and a light entry cavity located inside the central core section, the light entry cavity being opened at the rear side of the collimator lens and having a plurality of longitudinally-extending and distinct convex side wall surfaces, one for each of the lobed segments, each side wall surface being configured and disposed to collimate a portion of the light rays onto a corresponding one of the TIR inner peripheral surfaces, from which the light rays are reflected inside the collimator lens towards a corresponding one of the light exit surfaces, each side wall surface having an edge extending along the rear side of the collimator lens;

wherein the lobed segments are three to six in number.

2. The collimator lens according to claim 1, wherein the collimator lens includes one of the following features:
the material for the collimator lens is a solidified moldable plastic resin material;
the material for the collimator lens is at least one among the group consisting of acrylic glass, polymethyl methacrylate, polycarbonate, silicon and cyclic olefin copolymer, and has an index of refraction between 1.42 and 1.65.

3. The collimator lens according to claim 1, wherein the light exit surfaces are planar and have no optical power.

4. The collimator lens according to claim 3, wherein each light exit surface extends perpendicular to the central optical axis and is located on a projecting tip part of a corresponding one of the lobed segments.

5. The collimator lens according to claim 1, wherein at least one among the TIR inner peripheral surfaces and the light exit surfaces include micro-optic elements.

6. The collimator lens according to claim 1, wherein the lobed segments are axisymmetric with reference to the central optical axis.

7. An illumination device for conveying light rays coming from a light source and generally propagating along a central optical axis so as to form a variable light projection, the illumination device including:
a collimator lens having a solid monolithic structure and made of a transparent material having a first refractive index, the collimator lens having a rear side and a front side, the collimator lens including:
a central core section;
a plurality of spaced-apart and longitudinally-extending side lobed segments laterally disposed around the central core section, each lobed segment having a TIR inner peripheral surface extending from the rear side towards the front side of the collimator lens, and having a light exit surface generally facing the front side, the TIR inner peripheral surfaces being separated from one another by a medium having a second refractive index that is lower than the first refractive index; and
a light entry cavity located inside the central core section, the light entry cavity being opened at the rear side of the collimator lens and having at least one side wall surface configured and disposed to collimate a portion of the light rays onto a corresponding one of the TIR inner peripheral surfaces, from which the light rays are reflected inside the collimator lens towards a corresponding one of the light exit surfaces;
a diffusion lens coaxially disposed with reference to the central optical axis, the diffusion lens being positioned next to the front side of the collimator lens to redirect light coming out of the light exit surfaces, the diffusion lens having a plurality of spaced-apart outlying optical regions disposed around the central optical axis, at least one for each light exit surface, to be selectively positioned in or out of alignment with a corresponding one of the light exit surfaces of the collimator lens depending on a relative angular position between the collimator lens and the diffusion lens; and
means for changing the relative angular position between the collimator lens and the diffusion lens around the central optical axis;
wherein the lobed segments are three to six in number.

8. The illumination device according to claim 7, wherein the illumination device includes one of the following features:
the material for the collimator lens is a solidified moldable plastic resin material;
the material for the collimator lens is at least one among the group consisting of acrylic glass, polymethyl methacrylate, polycarbonate, silicon and cyclic olefin copolymer, and has an index of refraction between 1.42 and 1.65.

9. The illumination device according to claim 7, wherein the light exit surfaces are planar and have no optical power.

10. The illumination device according to claim 7, wherein the outlying optical regions on the diffusion lens include micro-optical structures providing a diffusing effect on the light rays when the light rays are received from the collimator lens.

11. The illumination device according to claim 7, wherein the diffusion lens has a planar disk-shaped main body extending radially with reference to the central optical axis.

12. The illumination device according to claim 7, wherein the central core section longitudinally extends partway within the collimator lens from the rear side towards the front side, the lobed segments being longer than the central core section along the central optical axis.

13. The illumination device according to claim 7, wherein each light exit surface extends perpendicular to the central optical axis and is located on a projecting tip part of a corresponding one of the lobed segments.

14. The illumination device according to claim 7, wherein the light entry cavity is concentric with referenced to the central optical axis.

15. The illumination device according to claim 7, wherein the light entry cavity has a plurality of longitudinally-extending and distinct convex side wall surfaces, one for each of the lobed segments.

16. The illumination device according to claim 7, wherein the illumination device including at least one of the following features:
the diffusion lens is positioned at a fixed distance immediately next to the front side of the collimator lens;
at least one among the TIR inner peripheral surfaces and the light exit surfaces include micro-optic elements.

17. The illumination device according to claim 7, wherein the lobed segments are axisymmetric with reference to the central optical axis.

18. An illumination device for conveying light rays coming from a light source and generally propagating along a central optical axis so as to form a variable light projection, the illumination device including:
a collimator lens having a solid monolithic structure and made of a transparent material having a first refractive index, the collimator lens having a rear side and a front side, the collimator lens including:
a central core section;
a plurality of spaced-apart and longitudinally-extending side lobed segments laterally disposed around the central core section, each lobed segment having a TIR inner peripheral surface extending from the rear side towards the front side of the collimator lens, and having a light exit surface generally facing the front side, the TIR inner peripheral surfaces being separated from one another by a medium having a second refractive index that is lower than the first refractive index; and a light entry cavity located inside the central core section, the light entry cavity being opened at the rear side of the collimator lens and having at least one side wall surface configured and disposed to collimate a portion of the light rays onto a corresponding one of the TIR inner peripheral surfaces, from which the light rays are reflected inside the collimator lens towards a corresponding one of the light exit surfaces;

a diffusion lens coaxially disposed with reference to the central optical axis, the diffusion lens being positioned next to the front side of the collimator lens to redirect light coming out of the light exit surfaces, the diffusion lens having a plurality of spaced-apart outlying optical regions disposed around the central optical axis, at least one for each light exit surface, to be selectively positioned in or out of alignment with a corresponding one of the light exit surfaces of the collimator lens depending on a relative angular position between the collimator lens and the diffusion lens; and means for changing the relative angular position between the collimator lens and the diffusion lens around the central optical axis;

wherein the illumination device includes at least one of the following features:

the collimator lens has a rotational symmetry with reference to the central optical axis;

the TIR inner peripheral surfaces are coaxially disposed with reference to the central optical axis.

19. The illumination device according to claim 18, wherein the lobed segments are at least three in number.

20. The illumination device according to claim 19, wherein the outlying optical regions on the diffusion lens include micro-optical structures providing a diffusing effect on the light rays when the light rays are received from the collimator lens.

* * * * *